US009197969B2

(12) United States Patent
Iwamoto et al.

(10) Patent No.: US 9,197,969 B2
(45) Date of Patent: Nov. 24, 2015

(54) OPTICAL MICROPHONE

(71) Applicant: Panasonic Corporation, Osaka (JP)

(72) Inventors: Takuya Iwamoto, Osaka (JP); Kazuo Yokoyama, Osaka (JP); Masahiko Hashimoto, Osaka (JP); Ushio Sangawa, Nara (JP); Yuriko Kaneko, Nara (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 189 days.

(21) Appl. No.: 13/950,961

(22) Filed: Jul. 25, 2013

(65) Prior Publication Data

US 2013/0308957 A1 Nov. 21, 2013

Related U.S. Application Data

(63) Continuation of application No. PCT/JP2012/006782, filed on Oct. 23, 2012.

(30) Foreign Application Priority Data

Oct. 24, 2011 (JP) ................................ 2011-233279
Oct. 24, 2011 (JP) ................................ 2011-233296

(51) Int. Cl.
*H04B 10/12* (2006.01)
*H04B 10/00* (2013.01)
*H04R 23/00* (2006.01)

(52) U.S. Cl.
CPC ....... *H04R 23/008* (2013.01); *Y10T 428/24008* (2015.01)

(58) Field of Classification Search
CPC ..... H04R 23/008; H04R 2410/00; H04R 1/34
USPC .................................................. 398/113, 133
See application file for complete search history.

(56) References Cited

U.S. PATENT DOCUMENTS 5,910,855 A * 6/1999 Thomas ........................ 359/285
6,014,239 A * 1/2000 Veligdan ....................... 398/134
(Continued)

FOREIGN PATENT DOCUMENTS

JP 59-157620 A 9/1984
JP 62-118320 A 5/1987
(Continued)

OTHER PUBLICATIONS

International Search Report for corresponding International Application No. PCT/JP2012/006782 mailed Nov. 27, 2012.

*Primary Examiner* — Ken Vanderpuye
*Assistant Examiner* — Abbas H Alagheband
(74) *Attorney, Agent, or Firm* — Renner, Otto, Boisselle & Sklar, LLP

(57) ABSTRACT

An optical microphone includes: an acousto-optic medium section having a pair of principal surfaces and at least one lateral surface provided therebetween; a restraint section which is in contact with the at least one lateral surface for preventing a shape change of the acousto-optic medium section; and a light emitting section for emitting a light wave so as to propagate through the acousto-optic medium section between the pair of principal surfaces. The pair of principal surfaces are in contact with an environmental fluid through which an acoustic wave to be detected is propagating and are capable of freely vibrating, and an optical path length variation of a light wave propagating through the acousto-optic medium section, which is caused by the acoustic wave that comes into the acousto-optic medium section from at least one of the pair of principal surfaces and propagates through the acousto-optic medium section, is detected.

18 Claims, 24 Drawing Sheets

(56) References Cited

U.S. PATENT DOCUMENTS

| | | | | |
|---|---|---|---|---|
| 6,147,787 | A * | 11/2000 | Veligdan | 398/133 |
| 8,306,429 | B2 * | 11/2012 | Hashimoto et al. | 398/132 |
| 8,542,956 | B2 * | 9/2013 | Akkaya et al. | 385/12 |
| 8,813,571 | B2 * | 8/2014 | Iwamoto et al. | 73/643 |
| 2002/0139066 | A1 * | 10/2002 | Szymanski et al. | 52/145 |
| 2005/0139013 | A1 * | 6/2005 | Hashimoto et al. | 73/861.27 |
| 2007/0165896 | A1 * | 7/2007 | Miles et al. | 381/356 |
| 2010/0180693 | A1 * | 7/2010 | Nagahara et al. | 73/861.27 |
| 2010/0209471 | A1 * | 8/2010 | Weber | 424/423 |
| 2011/0123199 | A1 * | 5/2011 | Hashimoto et al. | 398/134 |
| 2011/0170117 | A1 * | 7/2011 | Fischer | 356/519 |
| 2012/0204649 | A1 * | 8/2012 | Iwamoto et al. | 73/643 |
| 2012/0227499 | A1 * | 9/2012 | Amir et al. | 73/602 |
| 2013/0142519 | A1 * | 6/2013 | Iwamoto et al. | 398/133 |
| 2014/0153930 | A1 * | 6/2014 | Fischer | 398/133 |

FOREIGN PATENT DOCUMENTS

| | | | |
|---|---|---|---|
| JP | 2009-085868 | A | 4/2009 |
| WO | WO 2006/138697 | A2 | 12/2006 |

* cited by examiner

OPTICAL MICROPHONE

This is a continuation of International Application No. PCT/JP2012/006782, with an international filing date of Oct. 23, 2012, which claims priorities of Japanese Patent Application No. 2011-233279, filed on Oct. 24, 2011 and Japanese Patent Application No. 2011-233296, filed on Oct. 24, 2011, the contents of which are hereby incorporated by reference.

BACKGROUND

1. Technical Field

The present application relates to an optical microphone which is configured to receive an acoustic wave propagating through a gas, such as air, or an acoustic wave propagating through a solid, and convert the received acoustic wave to an electric signal using a light wave.

2. Description of the Related Art

A conventionally-known device for detecting an acoustic wave is a microphone. Many microphones, typified by dynamic microphones and condenser microphones, use a diaphragm. In these microphones, an input acoustic wave vibrates the diaphragm, and the vibration is extracted as an electric signal by means of the piezoelectric effect or a variation in electric capacity. An optical microphone which is configured to detect the vibration of the diaphragm using a light wave, such as a laser beam, is also known.

On the other hand, Japanese Laid-Open Patent Publication No. 2009-085868 (hereinafter, referred to as "Patent Document 1") discloses an optical microphone which is configured to detect an acoustic wave by means of a light wave, without using a diaphragm. As shown in FIG. 35, the optical microphone disclosed in Patent Document 1 includes an acousto-optic medium section 203 and a laser Doppler vibrometer 204. The acousto-optic medium section 203 is supported inside a recessed portion of a base 210, and the opening of the recessed portion is covered with a transparent plate 211. The base 210 has an opening portion 201. The opening portion is provided with a space that functions as an acoustic waveguide 202 which is formed by a lateral surface 203*a* of the acousto-optic medium section 203 and an inside surface of the recessed portion of the base 210.

An acoustic wave 205 propagating in the air is taken into the base 210 from the opening portion 201 so as to travel through the acoustic waveguide 202. The acoustic wave 205 is taken into the inside of the acousto-optic medium section 203 from the lateral surface 203*a* so as to propagate through the acousto-optic medium section 203.

In the acousto-optic medium section 203, propagation of the acoustic wave 205 causes a variation in refractive index. This refractive index variation is extracted by the laser Doppler vibrometer 204 as optical modulation, whereby the acoustic wave 205 is detected. Using a silica nanoporous element (dry silica gel) as the acousto-optic medium section 203 enables the acoustic wave 205 propagating in the acoustic waveguide 202 to be taken into the inside of the acousto-optic medium section 203 with high efficiency.

SUMMARY

However, in the above-described conventional techniques, further improvements in the acoustic characteristics have been demanded.

A nonlimiting exemplary embodiment of the present application provides an optical microphone which has improved acoustic characteristics.

An optical microphone according to one embodiment of the present invention includes: an acousto-optic medium section having a pair of principal surfaces and at least one lateral surface provided between the pair of principal surfaces; a restraint section which is in contact with the at least one lateral surface for preventing a shape change of the acousto-optic medium section; and a light emitting section for emitting a light wave so as to propagate through the acousto-optic medium section between the pair of principal surfaces, wherein the pair of principal surfaces are in contact with an environmental fluid through which an acoustic wave to be detected is propagating and are capable of freely vibrating, and an optical path length variation of a light wave propagating through the acousto-optic medium section, which is caused by the acoustic wave that comes into the acousto-optic medium section from at least one of the pair of principal surfaces and propagates through the acousto-optic medium section, is detected.

According to an optical microphone of an embodiment of the present invention, a restraint section is in contact with at least one lateral surface of an acousto-optic medium section so as to prevent shape change, and a pair of principal surfaces are in contact with an environmental fluid through which an acoustic wave to be detected is propagating and are capable of freely vibrating, so that a flatter frequency characteristic than those achieved in conventional optical microphones can be realized.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1:
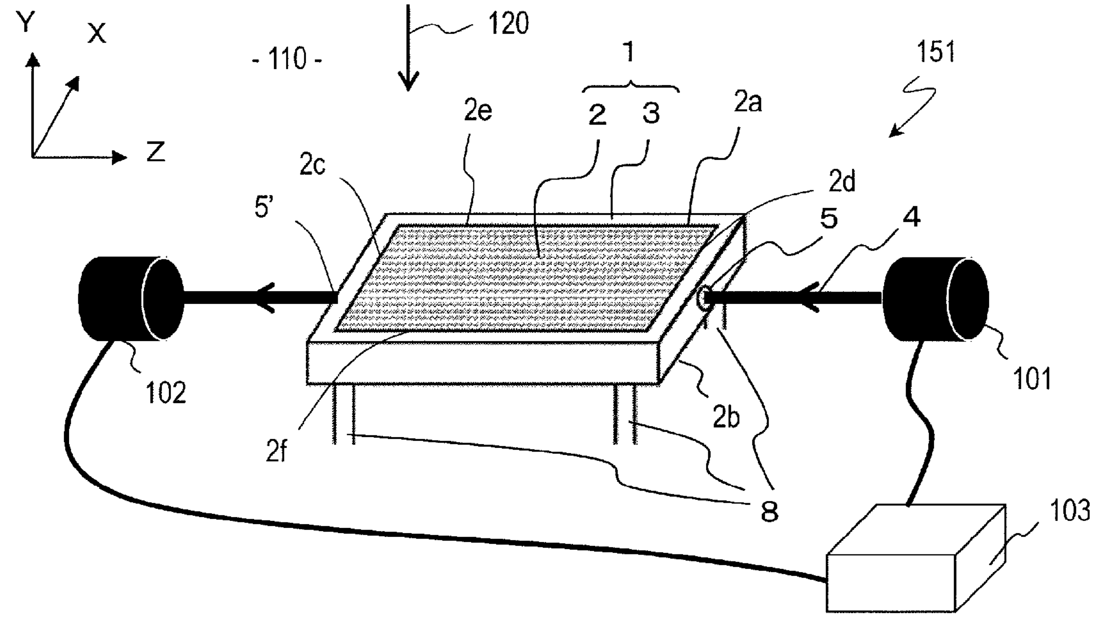
FIG. 1 is a diagram showing the essential part of the first embodiment of an optical microphone of the present invention.

The inventors of the present application examined the characteristics of the optical microphone of Patent Document 1 in detail for the purpose of improving the acoustic characteristics of the optical microphone. As a result, it was found that the optical microphone of Patent Document 1 has a resonant frequency which depends on the size of the acousto-optic medium section, and therefore, it is difficult to obtain a flat frequency characteristic in some cases. A possible solution to this problem is decreasing the size of the acousto-optic medium section in the optical microphone, as is the case with a conventional dynamic microphone, or the like, in which the size of the diaphragm is decreased so as to flatten the frequency characteristic. However, in this case, a lateral surface through which an acoustic wave comes in has a smaller size so that the acoustic wave cannot be taken in with sufficient intensity, and it is inferred that the sensitivity of the optical microphone decreases.

In view of the aforementioned problems in the conventional techniques, the inventors of the present application conceived an optical microphone which has excellent acoustic characteristics as compared with conventional optical microphones, particularly an optical microphone which has a novel configuration that is capable of realizing a flatter frequency characteristic than those achieved in conventional optical microphones. The summary of one embodiment of the present invention is as follows.

An optical microphone which is one embodiment of the present invention includes: an acousto-optic medium section having a pair of principal surfaces and at least one lateral surface provided between the pair of principal surfaces; a restraint section which is in contact with the at least one lateral surface for preventing a shape change of the acousto-optic medium section; and a light emitting section for emitting a light wave so as to propagate through the acousto-optic medium section between the pair of principal surfaces, wherein the pair of principal surfaces are in contact with an environmental fluid through which an acoustic wave to be detected is propagating and are capable of freely vibrating, and an optical path length variation of a light wave propagating through the acousto-optic medium section, which is caused by the acoustic wave that comes into the acousto-optic medium section from at least one of the pair of principal surfaces and propagates through the acousto-optic medium section, is detected.

According to an optical microphone of one embodiment of the present invention, the restraint section is in contact with at least one lateral surface of the acousto-optic medium section so as to prevent a shape change, and the pair of principal surfaces are in contact with an environmental fluid through which an acoustic wave to be detected is propagating and are capable of freely vibrating, so that a flatter frequency characteristic than those achieved in conventional optical microphones can be realized.

An optical microphone which is another embodiment of the present invention includes: an acousto-optic medium section having a pair of principal surfaces and at least one lateral surface provided between the pair of principal surfaces; and a light emitting section for emitting a light wave so as to propagate through the acousto-optic medium section between the pair of principal surfaces, wherein the pair of principal surfaces are in contact with an environmental fluid through which an acoustic wave to be detected is propagating and are capable of freely vibrating, and the light wave comes into the acousto-optic medium section at a position which is equidistant from the pair of principal surfaces when seen along a direction perpendicular to the pair of principal surfaces and goes out from the acousto-optic medium section at a position which is equidistant from the pair of principal surfaces, and an optical path length variation of a light wave propagating through the acousto-optic medium section, which is caused by the acoustic wave that comes into the acousto-optic medium section from at least one of the pair of principal surfaces and propagates through the acousto-optic medium section, is detected.

According to an optical microphone of another embodiment of the present invention, a light wave for detection of an acoustic wave is transmitted through the acousto-optic medium section at a position which is equidistant from the pair of principal surfaces when seen along a direction perpendicular to the pair of principal surfaces. Therefore, the effect which is attributed to the flexure of the acousto-optic medium section can be reduced, and a flat frequency characteristic can be realized.

An optical microphone of another embodiment may further include a restraint section which is in contact with the at least one lateral surface so as to prevent a shape change of the acousto-optic medium section.

The acousto-optic medium section may be formed by a solid whose acoustic velocity is slower than that of air.

The solid may be a silica nanoporous element.

The restraint section may have at least one opening through which a light wave from the light emitting section comes in and/or goes out, and the restraint section may be in contact with the at least one lateral surface of the acousto-optic medium section, exclusive of the at least one opening.

Each of the pair of principal surfaces may have a rectangular shape.

Each of the pair of principal surfaces may have an elliptical shape.

Each of the pair of principal surfaces may have an octagonal shape obtained by truncating a rhombus at its two opposite ends.

The acousto-optic medium section may have a thickness varying along a direction parallel to the pair of principal surfaces in a cross section perpendicular to the pair of principal surfaces.

The thickness may be greater at opposite ends than at a center when seen along a direction parallel to the pair of principal surfaces.

The thickness may be smaller at opposite ends than at a center when seen along a direction parallel to the pair of principal surfaces.

The optical microphone may further include a mirror provided at a position which is opposite to the at least one opening such that the acousto-optic medium section is interposed between the mirror and the at least one opening, wherein the light wave from the light emitting section comes into the acousto-optic medium section from the at least one opening and is reflected by the mirror, and thereafter, the light wave is again transmitted through the acousto-optic medium section and goes out from the at least one opening.

The restraint section may have a protruding portion extending in a direction not parallel to the at least one lateral surface, the protruding portion being inserted into the acousto-optic medium section.

In a cross section which is parallel to an extending direction of the protruding portion, a width of the protruding portion in a direction perpendicular to the extending direction is greater at a tip end of the protruding portion than at a base of the protruding portion.

The protruding portion may be parallel to the pair of principal surfaces and may extend along the at least one lateral surface.

The optical microphone may further include an optical interferometer which includes the light emitting section.

The optical microphone further includes a laser Doppler vibrometer which includes the light emitting section.

A nanoporous member which is one embodiment of the present invention includes: a nanoporous element which has at least one surface; and a restraint section which is in contact with the at least one lateral surface for preventing a shape change of the acousto-optic medium section, wherein the restraint section has a protruding portion extending in a direction not parallel to the at least one lateral surface, the protruding portion being inserted into the nanoporous element, and in a cross section which is parallel to an extending direction of the protruding portion, a width of the protruding portion in a direction perpendicular to the extending direction is greater at a tip end of the protruding portion than at a base of the protruding portion.

First Embodiment

Hereinafter, the first embodiment of an optical microphone of the present invention is described with reference to the drawings. FIG. 1 schematically shows the configuration of the essential part of the first embodiment of the optical microphone of the present invention. The optical microphone 151 shown in FIG. 1 includes an acoustic wave receiving section 1, which includes an acousto-optic medium section 2 and a restraint section 3, and a light emitting section 101. The light emitting section 101 and a light receiving section 102 are constituents of an optical interferometer 103 which has a light emitting section. The acoustic wave receiving section 1 is in contact with an environmental fluid 110. An acoustic wave 120 propagating through the environmental fluid 110 comes into the acoustic wave receiving section 1. A light wave 4 emitted from the light emitting section 101 passes through the acoustic wave receiving section 1. In the acoustic wave receiving section 1, the optical path length of the light wave is varied by the acoustic wave 120 that has come in, and therefore, the acoustic wave is detected by detecting this optical path length variation. That is, the acoustic wave is detected using the light wave. One of the major features of the optical microphone 151 resides in the configuration of the acoustic wave receiving section 1, which realizes a flatter frequency characteristic than those achieved in conventional optical microphones. Since the method of detecting an acoustic wave by means of a light wave can be realized by, for example, a known detection method such as disclosed in Patent Document 1, the configuration of the acoustic wave receiving section 1 which realizes a flat frequency characteristic is particularly described in detail in the following embodiments. The environmental fluid 110 is a gas or liquid. For example, the environmental fluid 110 may be air or water.

1. Configuration of the Optical Microphone 151

(1) Acousto-Optic Medium Section 2

The acousto-optic medium section 2 receives the acoustic wave 120 from the environmental fluid 110 and allows the acoustic wave 120 to propagate through the acousto-optic medium section 2. The acoustic wave 120 is a compression wave, and therefore, the density of the acousto-optic medium section 2 varies in a region through which the acoustic wave 120 is propagating, resulting in occurrence of a refractive index variation. The acousto-optic medium section 2 may be made of a material which has a small difference in acoustic impedance from the environmental fluid such that the acoustic wave 120 is efficiently taken into the acousto-optic medium section 2 across the interface between the environmental fluid 110 and the acousto-optic medium section 2, while reducing reflection of the acoustic wave 120 at the interface as much as possible. For example, when a silica nanoporous element (dry silica gel) is used as the material for the acousto-optic medium section 2, the difference in acoustic impedance from air is small, so that the acoustic wave 120 propagating through the air can be taken into the acousto-optic medium section 2 with high efficiency. The sound velocity of the silica nanoporous element is about from 50 m/sec to 150 m/sec, which is smaller than the sound velocity in the air, 340 m/sec. The density of the silica nanoporous element is also small, which is about from 70 kg/m$^3$ to 280 kg/m$^3$. Therefore, the acoustic impedance of the silica nanoporous element is about 8 to 100 times that of the air, i.e., the difference in acoustic impedance is small, and the reflection at the interface is small, so that the acoustic wave in the air can be efficiently taken into the silica nanoporous element. For example, when a silica nanoporous element with the sound velocity of 50 m/sec and the density of 100 kg/m$^3$ is used for the acousto-optic medium section 2, the reflection at the interface with the air is 70%, while about 30% of the energy of the acoustic wave is taken into the acousto-optic medium section 2 without being reflected.

When a silica nanoporous element is used as the material for the acousto-optic medium section 2, the refractive index variation Δn for the light wave can be greater than in the case of using a different material. For example, the refractive index variation Δn of the air for the acoustic pressure variation of 1 Pa is $2.0\times10^{-9}$, while the refractive index variation Δn of the silica nanoporous element for the acoustic pressure variation of 1 Pa is about $1.0\times10^{-7}$, which is greater than the former.

The acousto-optic medium section 2 has a pair of principal surfaces 2*a*, 2*b* and at least one lateral surface which is provided between the pair of principal surfaces 2*a*, 2*b* as shown in FIG. 1. In the present embodiment, the principal surfaces 2*a*, 2*b* have a rectangular shape, and therefore, the acousto-optic medium section 2 has four lateral surfaces 2*c*, 2*d*, 2*e*, 2*f*. The principal surfaces refer to one of a plurality of surfaces that form the three-dimensional shape of the acousto-optic medium section 2 which has the largest area and another one of the plurality of surfaces which has the second largest area. In the present embodiment, the principal surface 2*a* and the principal surface 2*b* have the same shape. In any cross section which is perpendicular to the principal surfaces 2*a*, 2*b*, the thickness along the direction that is perpendicular to the principal surfaces 2*a*, 2*b* is constant. The principal surfaces 2*a*, 2*b* are surfaces through which the acoustic wave 120 is taken into the acousto-optic medium section 2 from the environmental medium 110.

The shape of the acousto-optic medium section 2 is not limited to the above-described shape, but various shapes may be used for the acousto-optic medium section 2. Alternative shapes of the acousto-optic medium section 2 will be described later.

The size of the acousto-optic medium section 2 depends on the use of the optical microphone 151, the frequency of the acoustic wave 120 to be detected, the material that forms the acousto-optic medium section 2, etc.

(2) Restraint Section 3

The restraint section 3 is in contact with the acousto-optic medium section 2 so as to prevent a shape change of the acousto-optic medium section 2. To realize a flatter frequency characteristic than those achieved in conventional optical microphones, the restraint section 3 is in contact with at least one lateral surface of the acousto-optic medium section 2 so as to prevent a shape change of the lateral surface of the acousto-optic medium section 2. The pair of principal surfaces 2*a*, 2*b* are in contact with the environmental fluid 110 through which the acoustic wave 120 to be detected is propagating and are capable of freely vibrating. The direction in which the restraint section 3 prevents a shape change of the acousto-optic medium section 2 may be all of the directions which are perpendicular to the propagation direction of the acoustic wave 120 or may be a single arbitrary direction which is perpendicular to the propagation direction of the acoustic wave. In the present embodiment, the restraint section 3 is provided at the four lateral surfaces 2*c*, 2*d*, 2*e*, 2*f* of the acousto-optic medium section 2 and are in contact with these lateral surfaces so as to prevent a shape change of the acousto-optic medium section 2 in all of the directions which are perpendicular to the propagation direction of the acoustic wave 120. In the present embodiment, the restraint section 3 has a shape of a frame which has four inside lateral surfaces that are in contact with the four lateral surfaces 2*c*, 2*d*, 2*e*, 2*f*.

The restraint section 3 may have a greater elastic modulus than the acousto-optic medium section 2 in order to prevent a shape change of the acousto-optic medium section 2. The restraint section 3 may be made of a material which is transparent to the light wave 4 emitted from the light emitting section 101, such as glass, an acrylic material, or the like. Alternatively, the restraint section 3 may be made of a non-transparent material, such as a metal, Teflon (registered trademark), or the like. Note that, however, when the restraint section 3 is made of a material which is not transparent to the light wave 4, the restraint section 3 may have at least one opening through which the light wave 4 comes into the acousto-optic medium section 2 and the light wave 4 transmitted through the acousto-optic medium section 2 goes out from the acousto-optic medium section 2. In the present embodiment, the restraint section 3 have openings 5, 5' at positions corresponding to the lateral surfaces 2*c*, 2*d* of the acousto-optic medium section 2.

Figure 2:
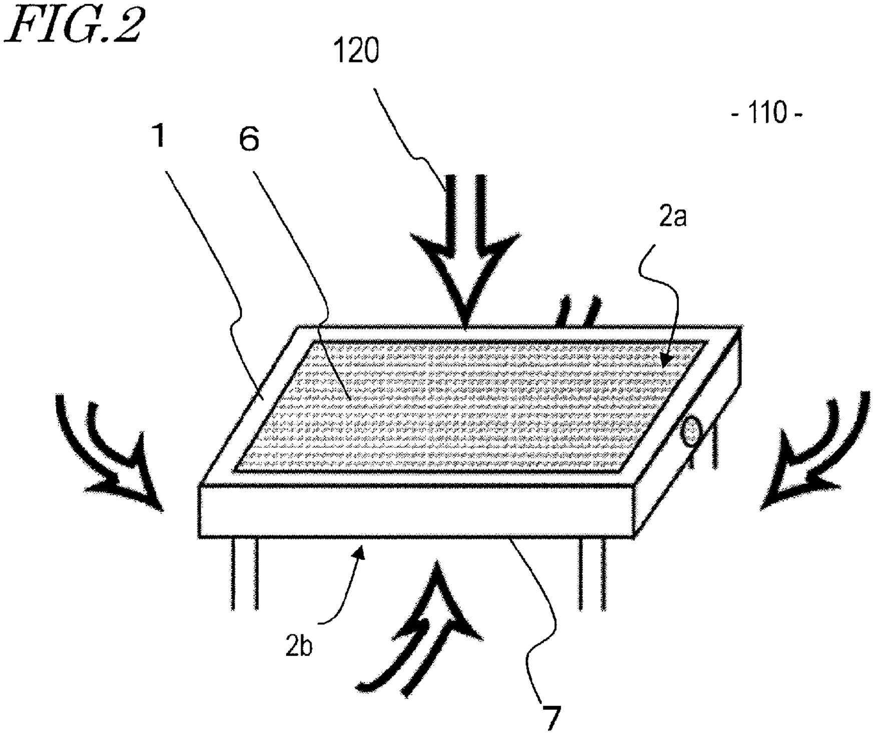
FIG. 2 is a diagram illustrating incoming of an acoustic wave onto an acoustic wave receiving section.

In the acoustic wave receiving section 1 that is formed by the acousto-optic medium section 2 and the restraint section 3, the acoustic wave 120 can come into the acoustic wave receiving section 1 from the principal surfaces 2*a*, 2*b*. Of the acoustic wave 120 propagating through the environmental fluid 110, a portion comes into the acousto-optic medium section 2 from the principal surface 2*a*, while part of another portion of the acoustic wave 120 which does not come into the acousto-optic medium section 2 from the principal surface 2*a* makes a detour to come into the acousto-optic medium section 2 from the principal surface 2*b* as shown in FIG. 2. The two principal surfaces 2*a*, 2*b* may be free ends which are capable of vibrating. The lateral surfaces 2*c*, 2*d*, 2*e*, 2*f* that are in contact with the restraint section can be regarded as fixed ends which are prevented from vibrating. A case for supporting the acoustic wave receiving section 1 may be provided to the restraint section 3 so as not to be in contact with the two principal surfaces 2*a*, 2*b*. For example, as shown in FIG. 1, supporting sections 8 may be attached to the restraint section 3, and gaps may be provided between the case and the two principal surfaces 2*a*, 2*b* such that the principal surfaces 2*a*, 2*b* are in contact with the environmental fluid 110. With this configuration, the principal surfaces 2*a*, 2*b* from which the acoustic wave comes in are in contact with a space (gap) which is filled with the environmental fluid 110. The lateral surfaces 2*c*, 2*d*, 2*e*, 2*f* are not in direct contact with the space that is filled with the environmental fluid 110. There is the restraint section 3 between the space and the lateral surfaces 2*c*, 2*d*, 2*e*, 2*f*.

Fixing of the acousto-optic medium section 2 may be realized by adhering together the acousto-optic medium section 2 and the restraint section 3 using an adhesive agent, or the like. Alternatively, the acousto-optic medium section 2 may be fixed by fastening the lateral surfaces using a fastening mechanism provided in the restraint section 3. For example, the acousto-optic medium section 2 is bound by the restraint section 3 between the lateral surface 2*c* and the lateral surface 2*d* and between the lateral surface 2*e* and the lateral surface 2*f*. As will be described later, when the acousto-optic medium section 2 is prepared by a sol-gel process, the restraint section 3 may have an anchor which is to be inserted into the acousto-optic medium section 2.

(3) Light Emitting Section 101, Light Receiving Section 102, Optical Interferometer 103

When the acoustic wave 120 comes into the acousto-optic medium section 2, the density distribution of the acousto-optic medium section 2 propagates according to propagation of the acoustic wave 120 that is a longitudinal wave, resulting in occurrence of a refractive index variation. To detect this refractive index variation, the light wave 4 emitted from the light emitting section 101 is allowed to come into the acousto-optic medium section 2 so as to propagate through the acousto-optic medium section 2 between the principal surfaces 2*a*, 2*b*. In this way, a variation in the optical path length of the light wave 4 propagating through the acousto-optic medium section 2 is detected, whereby the acoustic wave 120 is detected. The optical microphone 151 of the present embodiment uses the optical interferometer 103 in order to detect the optical path length variation of the light wave 4. Specifically, the light wave 4 is emitted from the light emitting section 101 of the optical interferometer and detected by the light receiving section 102, whereby a phase variation of the light wave 4 propagating through the acousto-optic medium section 2 is detected. By this process, the optical path length variation of the light wave 4 in the acousto-optic medium section 2 can be detected. Examples of the optical interferometer for detecting the optical path length variation include a heterodyne interferometer, a homodyne interferometer such as a Mach-Zehnder interferometer, a laser Doppler vibrometer, etc.

2. Operation and Analysis Results of the Optical Microphone 151

When the acoustic wave 120 comes into the acousto-optic medium section 2 of the optical microphone 151 of the present embodiment and then propagates therethrough, the acoustic pressure which is applied at the time of incoming of the acoustic wave 120 deforms the acousto-optic medium section 2, causing a dimensional change. Due to this dimensional change, an optical path length variation occurs in the acousto-optic medium section 2. Further, after having come into the acousto-optic medium section 2, the acoustic wave 120 propagates through the acousto-optic medium section to cause a refractive index variation. In the optical microphone 151, both the optical path length variation which is attributed to the dimensional change of the acousto-optic medium section 2 and the refractive index variation which is attributed to the propagation of the acoustic wave are considered in order to realize a flatter frequency characteristic than those achieved in conventional optical microphones.

Figure 3:
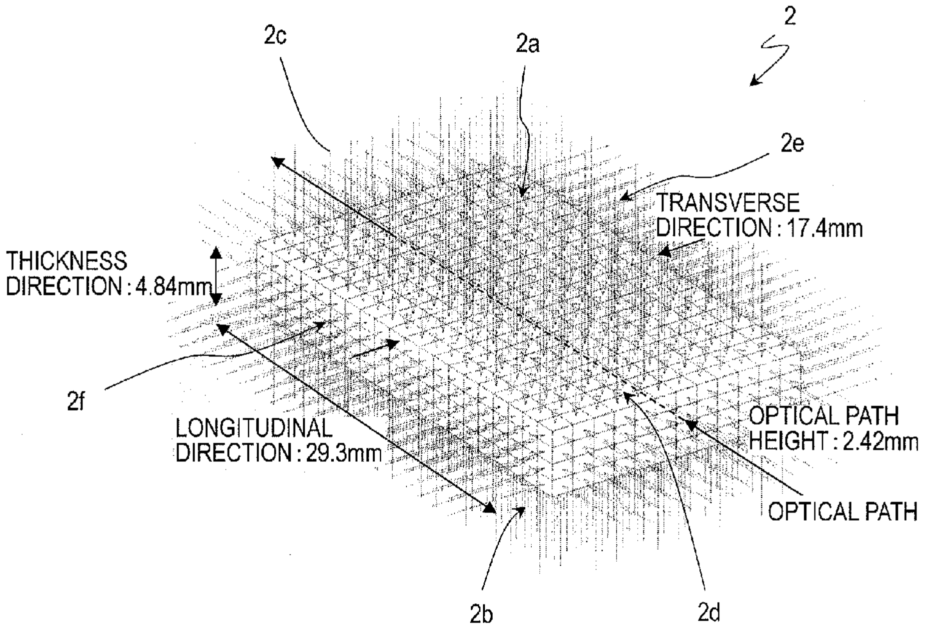
FIG. 3 is a diagram showing a shape and analytical model of an acousto-optic medium section used in analysis.

To examine the relationship between the optical path length variation which is attributed to the dimensional change of the acousto-optic medium section 2 and the refractive index variation which is attributed to the propagation of the acoustic wave and detection of the acoustic wave 120, the acousto-optic medium section 2 was modeled as shown in FIG. 3. The relationship between the optical path length variation of the acousto-optic medium section 2 and the frequency characteristic was analyzed by a simulation in which a finite element method was used.

The acousto-optic medium section 2 which was in the shape of a rectangular parallelepiped as shown in FIG. 3 was used for the analysis. Specifically, as shown in FIG. 3, the acousto-optic medium section 2 with the dimensions of 29.3 mm (longitudinal direction)×17.4 mm (transverse direction)×4.84 mm (thickness direction) was used. The optical path of the acousto-optic medium section 2 was configured to extend along the longitudinal direction of the rectangular parallelepiped. The position of the optical path in the acousto-optic medium section 2 was at a position of 8.7 mm along the transverse direction of the rectangular parallelepiped and 2.42 mm along the thickness direction. That is, the optical path was configured to pass through the centers of the lateral surfaces 2*c*, 2*d* that face each other in the longitudinal direction.

The material of the acousto-optic medium section 2 used in the simulation was a silica nanoporous element with the modulus of longitudinal elasticity of 0.2402 MPa, the Poisson's ratio of 0.24, and the density of 0.108 g/cm$^3$. The attenuation coefficient of the acousto-optic medium section 2 was 0.0084 at 790 Hz, and 0.059 at 40 kHz. It was assumed that the acoustic wave comes into the acousto-optic medium section 2 through all the interfaces between the surfaces of the rectangular parallelepiped and the environmental fluid at equal pressures. The three analysis steps for specifying the frequency are described below.

First, the relationship between the optical path length variation and the frequency characteristic was calculated for the case where only the optical path length variation which is attributed to the refractive index variation caused by propagation of the acoustic wave was considered and the case where only the optical path length variation which is attributed to the dimensional change caused by deformation of the acousto-optic medium section 2 was considered. The results are shown in FIG. 4 and FIG. 5.

Figure 6:
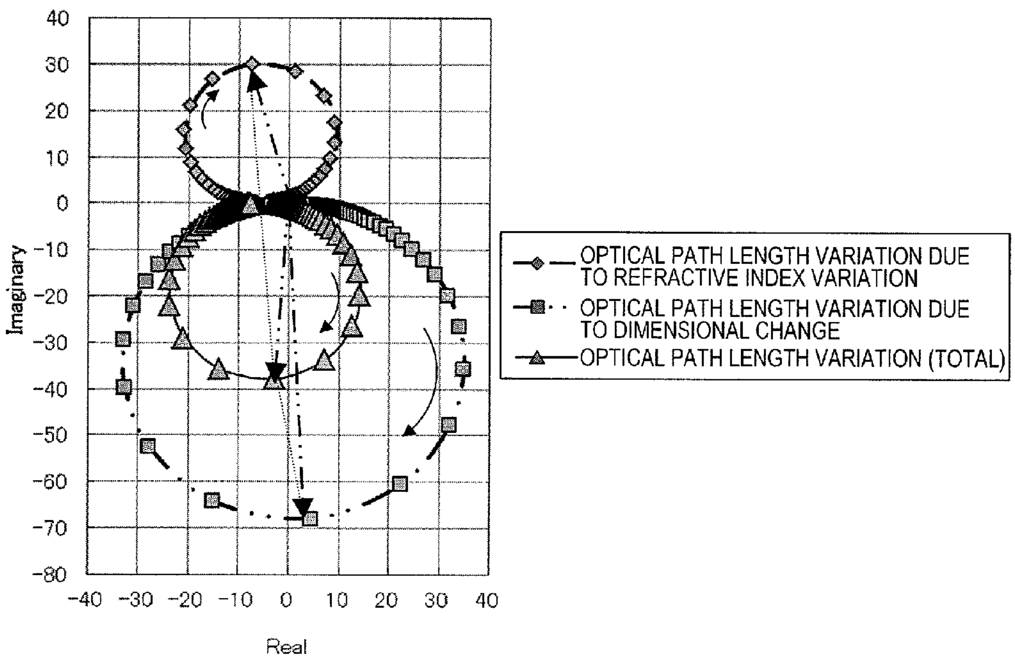
FIG. 6 is a Nyquist diagram showing the phase relationship of FIG. 4 and FIG. 5.
Figure 7A:
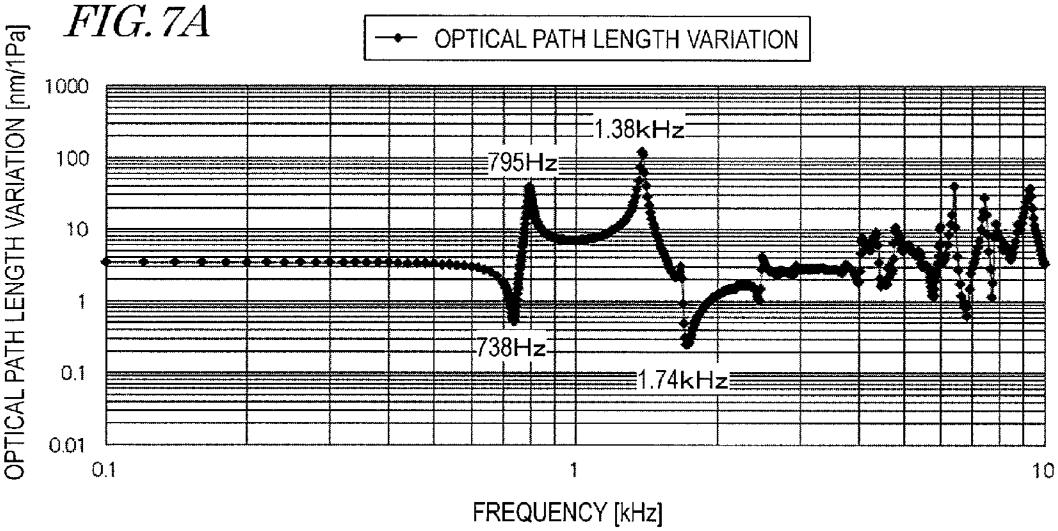
FIG. 7A is a graph showing the frequency characteristic of an optical path length variation which is attributed to a refractive index variation and a dimensional variation in the analytical model shown in FIG. 3.

Then, the sum of the two optical path length variations was calculated from the frequency characteristics of the two optical path length variations. Specifically, FIG. 6 is a Nyquist diagram showing the respective optical path length variations, together with their phases and amplitudes. The vector sum of the Nyquist diagram (the solid line with triangular marks) is equivalent to the sum of the two optical path length variations. FIG. 7A shows a frequency characteristic which represents the response to the frequency of the amplitude obtained from the optical path length variation calculated from the Nyquist diagram.

Figure 7B:
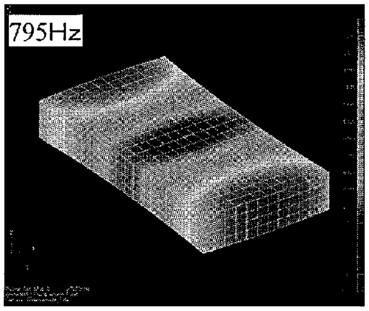
FIGS. 7B and 7C are diagrams showing the results of vibration analyses at 795 Hz and 1.38 kHz.
Figure 7C:
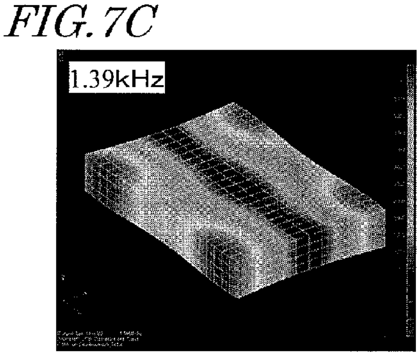
Figure 8:
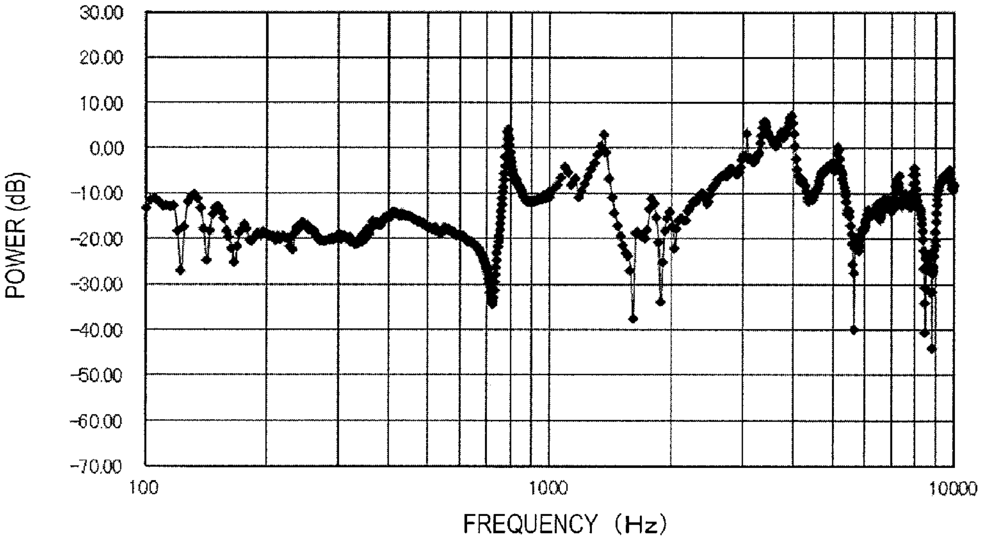
FIG. 8 is a graph showing the frequency characteristic of an optical path length variation in a prototype acousto-optic medium section.

Then, to evaluate the validity of the simulation results, a sample of the acousto-optic medium section 2 which had the dimensions shown in FIG. 7 and which was formed by a silica nanoporous element was prepared, and the frequency characteristic was measured. FIG. 8 shows the result of the measurement of the frequency characteristic. Specifically, the light wave 4 and the acoustic wave 120 were allowed to propagate through the acousto-optic medium section 2, and the frequency characteristic of the acousto-optic medium section 2 was measured.

Figure 4:
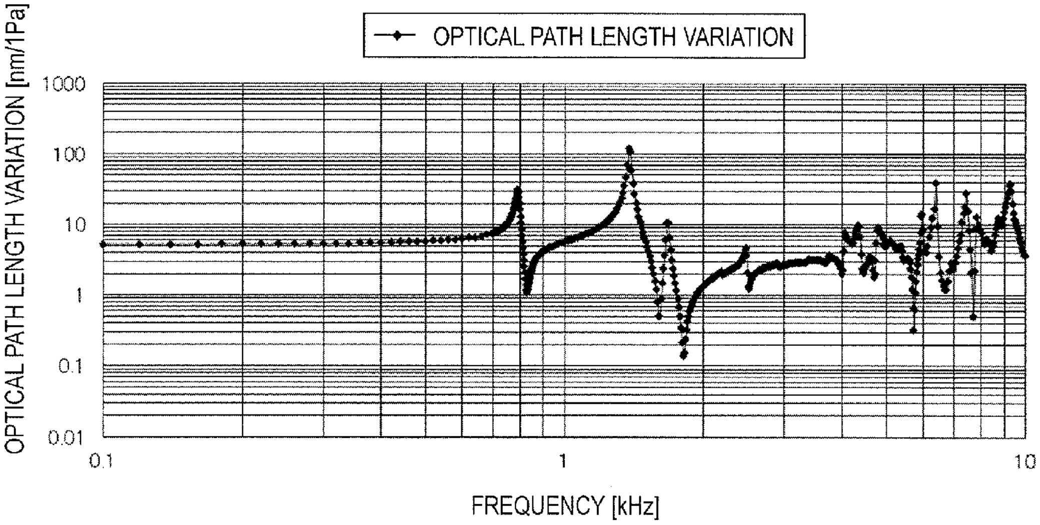
FIG. 4 is a graph showing the frequency characteristic of an optical path length variation which is attributed to a refractive index variation in the analytical model shown in FIG. 3.
Figure 5:
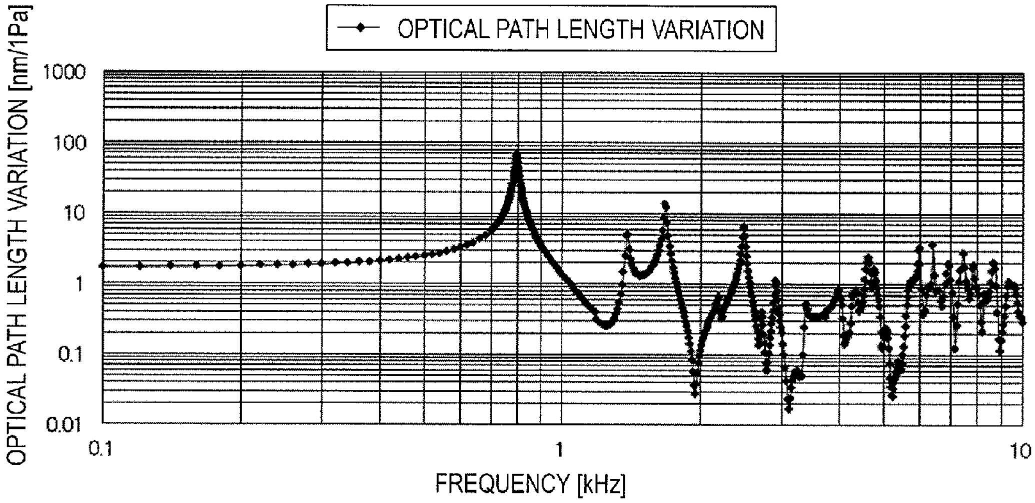
FIG. 5 is a graph showing the frequency characteristic of an optical path length variation which is attributed to a dimensional variation in the analytical model shown in FIG. 3.

It can be seen that the measurement result shown in FIG. 8 does not accord well with the simulation results shown in FIG. 4 and FIG. 5 but generally accords with the simulation result shown in FIG. 7A. It is inferred from this that, when the acoustic wave is allowed to come into the acousto-optic medium section 2, the optical path length variation occurs due to both the refractive index variation caused by propagation of the acoustic wave and the dimensional change of the acousto-optic medium section 2, rather than that only either of the optical path length variation which is attributed to the refractive index variation caused by propagation of the acoustic wave or the optical path length variation which is attributed to the dimensional change of the acousto-optic medium section 2 occurs.

In the result of the analysis of the frequency characteristic which is shown in FIG. 7A, peaks which are attributed to resonance occur at the frequencies of 795 Hz and 1.38 kHz, and dips occur at the frequencies of 738 Hz and 1.74 kHz. That is, the acousto-optic medium section 2 resonates at the frequencies of 795 Hz and 1.38 kHz. It is appreciated from the analysis results shown in FIGS. 7B and 7C that the frequency of 795 Hz corresponds to the resonance in the longitudinal direction, and the frequency of 1.38 kHz corresponds to the resonance in the transverse direction.

In a conventional dynamic microphone which uses a diaphragm, the size of the diaphragm is decreased such that the resonant frequency of the diaphragm is shifted to the higher frequency side than the audible range, whereby the frequency band of the audible range is flattened. However, if in the optical microphone the dimensions of the acousto-optic medium section 2 along the longitudinal direction and the transverse direction are reduced using the same means, the length of the optical path along which the light wave 4 propagates through the acousto-optic medium section 2 decreases, so that the sensitivity of the microphone decreases. In view of such, flattening of the frequency band needs to be realized without reducing the optical path length. In the optical microphone 151 of the present embodiment, flattening of the frequency band is realized without reducing the optical path length. Therefore, control of the resonance is realized by changing the boundary conditions for the lateral surfaces of the acousto-optic medium section 2.

Figure 9:
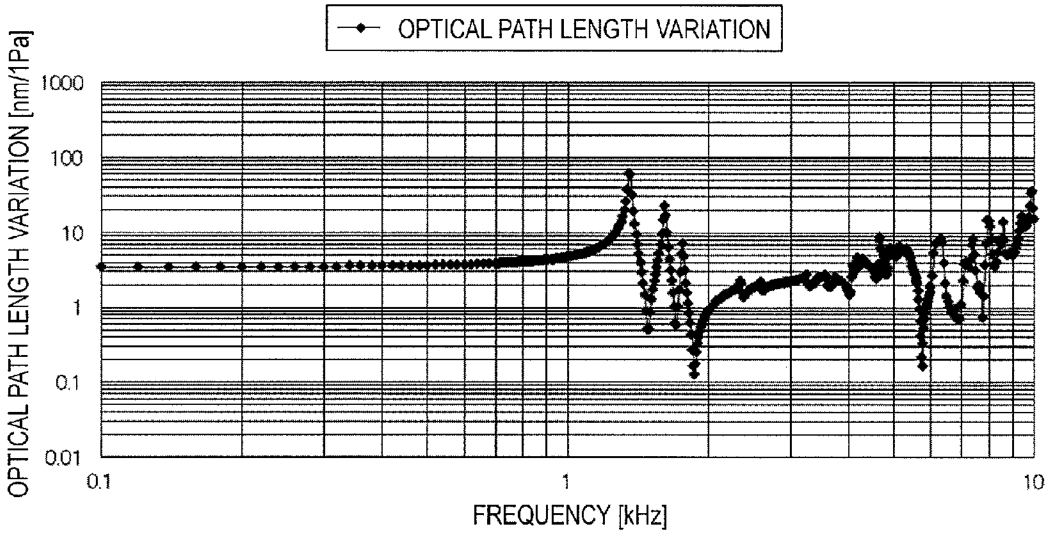
FIG. 9 is a graph showing the frequency characteristic of an optical path length variation where the lateral surfaces in the longitudinal direction are fixed in the analytical model shown in FIG. 3.

Analysis of the model of the acousto-optic medium section 2 shown in FIG. 3 was carried out, where surfaces which served as incoming/outgoing surfaces for the light wave 4, i.e., two lateral surfaces 2$c$, 2$d$ which were perpendicular to the longitudinal direction, were fixed ends. The result of the analysis is shown in FIG. 9. As seen from the comparison with FIG. 7, it can be confirmed that the peaks and dips near 800 Hz are prevented from occurring in FIG. 9. This is probably because the resonance in the longitudinal direction can be prevented by fixing the two lateral surfaces 2$c$, 2$d$ that are perpendicular to the longitudinal direction. For the same reason, when analysis is carried out with the two surfaces that are perpendicular to the transverse direction being fixed, the resonance in the transverse direction can be prevented.

Figure 10:
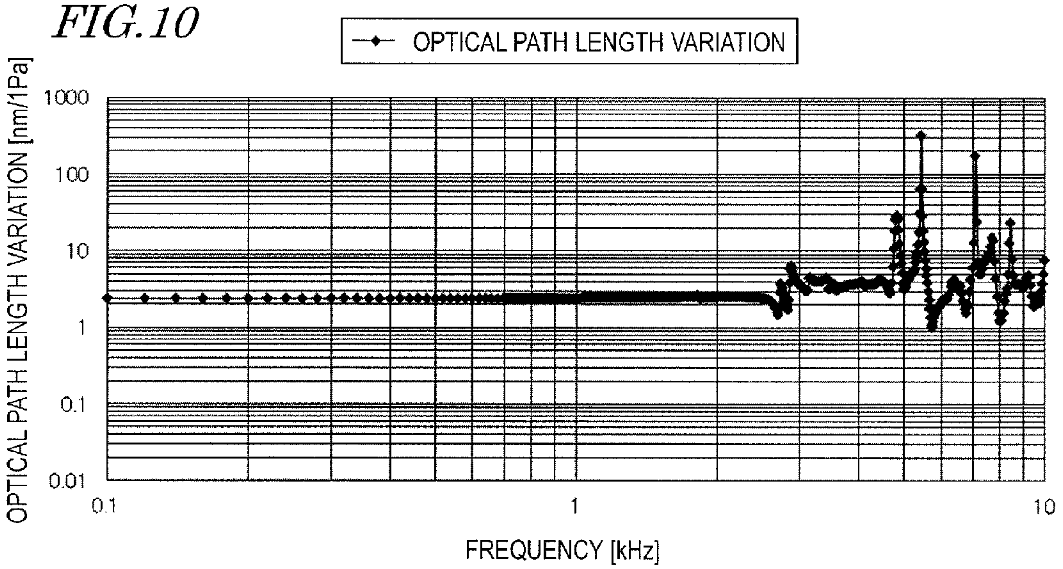
FIG. 10 is a graph showing the frequency characteristic of an optical path length variation where the lateral surfaces in the longitudinal direction and the transverse direction are fixed in the analytical model shown in FIG. 3.

Then, analysis was carried out with not only the lateral surfaces 2$c$, 2$d$ that are perpendicular to the longitudinal direction but also the lateral surfaces 2$e$, 2$f$ that are perpendicular to the transverse direction being fixed ends. The result of the analysis is shown in FIG. 10. As seen from the comparison with FIG. 7, it can be confirmed that not only the peaks and dips near 800 Hz but also the peaks and dips near 1.5 kHz are prevented from occurring in FIG. 10.

Figure 11:
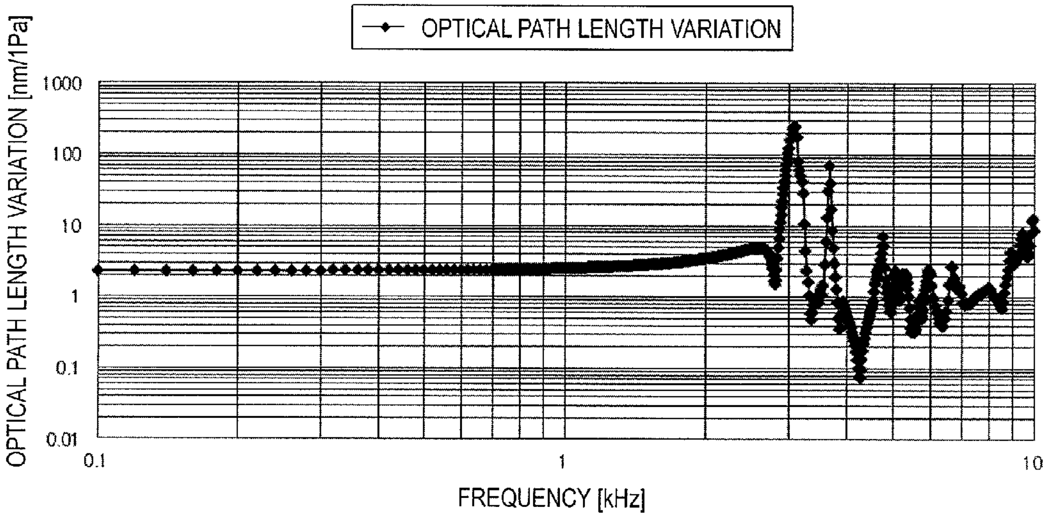
FIG. 11 is a graph showing the frequency characteristic of an optical path length variation where the lateral surfaces in the longitudinal direction and the transverse direction and one principal surface are fixed in the analytical model shown in FIG. 3.

Then, the frequency characteristic was analyzed with one of the principal surfaces 2$a$, 2$b$ (e.g., the principal surface 2$b$) being a fixed end. The result of the analysis is shown in FIG. 11. As seen from the comparison with FIG. 10, a new peak occurred near 3 kHz in FIG. 11. Therefore, deterioration of the flatness of the frequency characteristic can be confirmed. It is seen from the above analysis results that, as shown in FIG. 11, the frequency characteristic of the optical path length variation can be the flattest when the lateral surfaces, excluding the principal surfaces 2$a$, 2$b$, are fixed.

As described above, according to the optical microphone of the present embodiment, the restraint section is in contact with at least one lateral surface of the acousto-optic medium section so as to prevent a shape change, and a pair of principal surfaces are in contact with an environmental fluid in which an acoustic wave to be detected is propagating and are capable of freely vibrating, such that a flatter frequency characteristic than those achieved in conventional optical microphones can be realized. Such a frequency characteristic can be realized without reducing the size of the acousto-optic medium section 2. Thus, a light wave which is used for detection is transmitted through the acousto-optic medium section between the pair of principal surfaces so that the optical path can have a long length, and therefore, the sensitivity of the microphone can be improved. Therefore, a high-sensitivity optical microphone which has a flat frequency characteristic can be realized.

3. Variations

The optical microphone of the present embodiment can have various variations. Hereinafter, embodiments other than that described above, or variations thereof, are described.

(1) Variation of Restraint Section

Although in the above-described embodiment the restraint section 3 has a shape of a frame, restraining at least one lateral surface of the acousto-optic medium section 2 can realize a flatter frequency characteristic than those achieved in conventional optical microphones.

Figure 12:
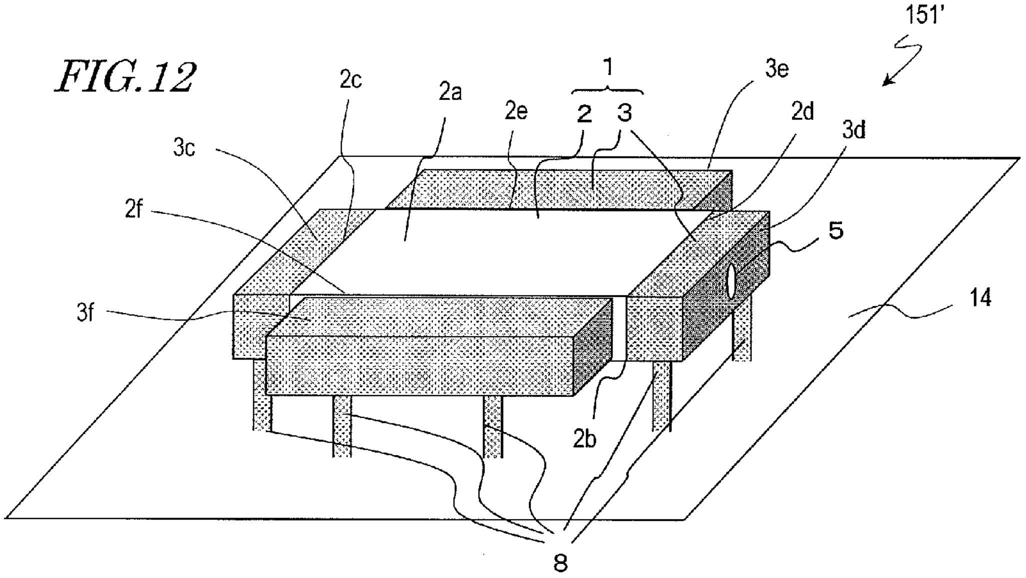
FIG. 12 is a diagram showing another embodiment of the restraint section.

For example, an optical microphone 151' shown in FIG. 12 includes four separate restraint sections 3$c$, 3$d$, 3$e$, 3$f$. The restraint sections 3$c$, 3$d$, 3$e$, 3$f$ are respectively in contact with the lateral surfaces 2$c$, 2$d$, 2$e$, 2$f$ of the acousto-optic medium section 2 so as to prevent deformation in the shape of the acousto-optic medium section 2. In the case where the effect of preventing the shape deformation deteriorates because the restraint sections 3$c$, 3$d$, 3$e$, 3$f$ are separate, supporting sections 8 connected to the restraint sections 3$c$, 3$d$, 3$e$, 3$f$ are secured to a case 130 such that the resonance of the acousto-optic medium section 2 is prevented, and a flat frequency characteristic can be realized.

Figure 13:
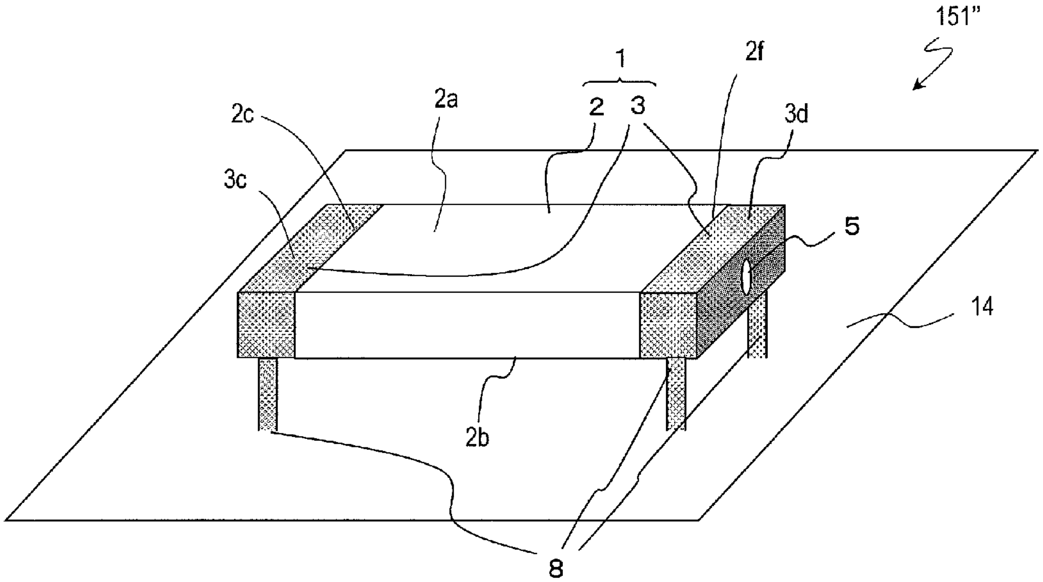
FIG. 13 is a diagram showing still another embodiment of the restraint section.

An optical microphone 151" shown in FIG. 13 includes two separate restraint sections 3$c$, 3$d$. The restraint sections 3$c$, 3$d$ are respectively in contact with the lateral surfaces 2$c$, 2$d$ among the lateral surfaces 2$c$, 2$d$, 2$e$, 2$f$ of the acousto-optic medium section 2 so as to prevent deformation in the shape of the acousto-optic medium section 2. In this case, particularly, resonance in the longitudinal direction of the acousto-optic medium section 2 can be prevented. In the case where a flat frequency characteristic is demanded only in a specific frequency range, an optical microphone which has desired characteristics can be realized even when such restraint sections are used.

The method of joining the restraint section and the acousto-optic medium section is not limited to adhesion. In the case where securing the acousto-optic medium section 2 and the restraint section 3 to each other using an adhesive agent, or the like, can lead to that the adhesive agent enters the acousto-optic medium section 2 and affects the characteristics of the acousto-optic medium section 2, the restraint section and the acousto-optic medium section may be joined together or secured to each other by a different method.

Figure 14A:
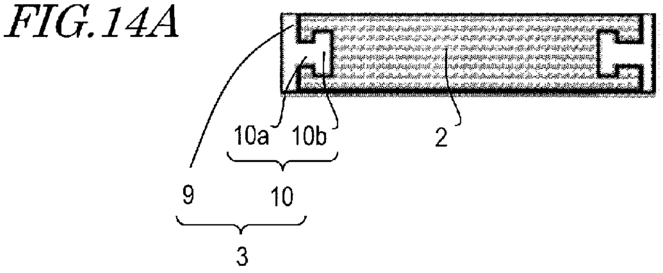
FIGS. 14A to 14C are diagrams showing embodiments of the restraint section which has an anchor.
Figure 14B:
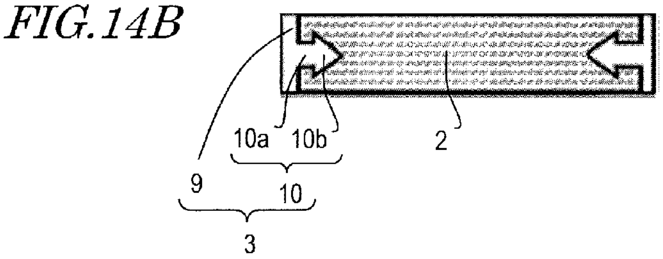
Figure 14C:
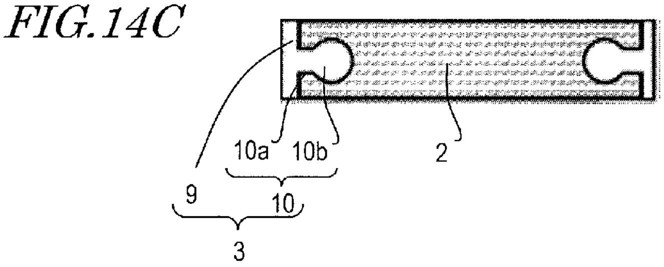

For example, as shown in FIGS. 14A to 14C, a restraint section 3', which has a protruding portion 10 extending in a direction not parallel to the lateral surfaces of the acousto-optic medium section 2, may be in contact with the acousto-optic medium section 2 so as to prevent a shape change. This configuration prevents the end portions of the acousto-optic medium section 2 from vibrating due to resonance, or the like. The restraint section 3' may have a frame 9 and a protruding portion 10 which is in a shape of an anchor extending from the frame in a direction not parallel to the lateral surfaces of the acousto-optic medium section 2. Specifically, the protruding portion 10 is designed such that, in a cross section which is parallel to the extending direction of the protruding portion 10, the width of the protruding portion 10 in a direction perpendicular to the extending direction is greater at the base 10*a* than at the tip end 10*b*. This configuration prevents deformation due to shrinkage of the acousto-optic medium section 2. As shown in FIGS. 14A to 14C, the cross-sectional shape at the tip end 10*b* may be rectangular, triangular, circular, or the like. The cross-sectional shape which is perpendicular to the extending direction of the protruding portion 10 may be circular or rectangular or may be a rectangular shape whose longer side extends along the longitudinal direction of a corresponding lateral surface of the acousto-optic medium section 2. In this case, the protruding portion 10 extends along the longitudinal direction of a corresponding lateral surface of the acousto-optic medium section 2.

Figure 15A:
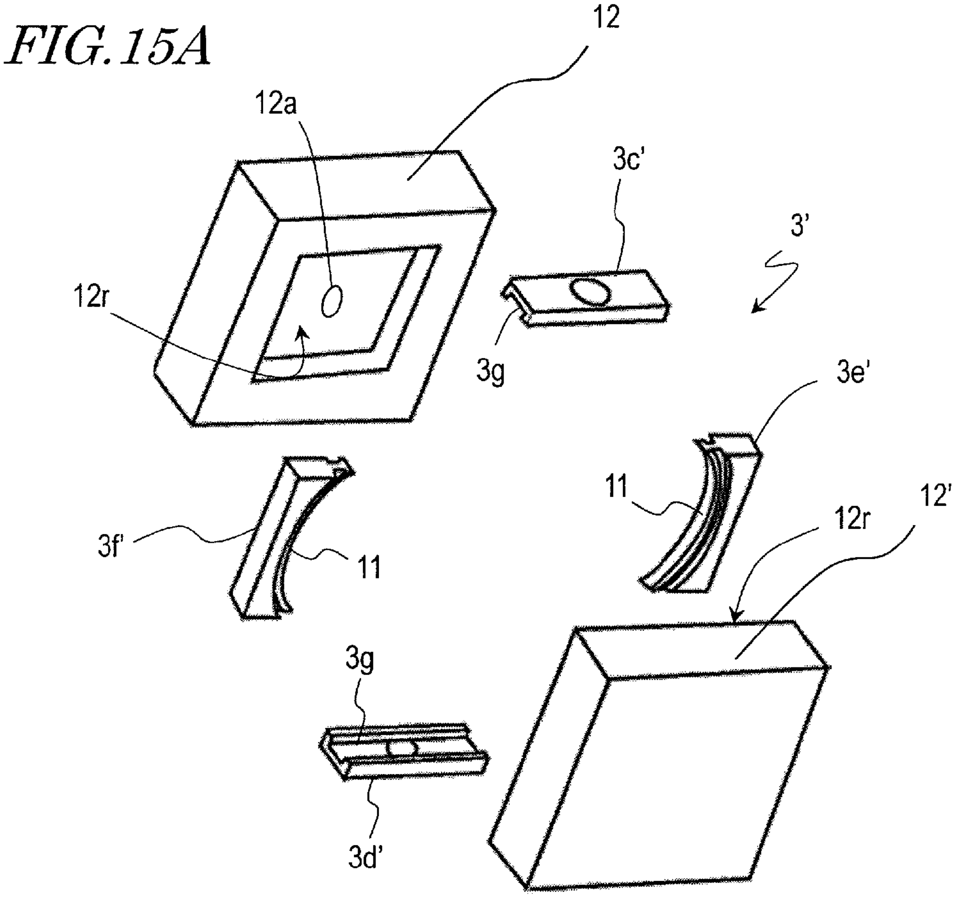
FIGS. 15A and 15B are diagrams illustrating a manufacturing method of an acoustic wave receiving section which uses a restraint section having an anchor.

The acoustic wave receiving section 1 including such a restraint section 3' can be manufactured by, for example, a method which is described as follows. As shown in FIG. 15A, restraint sections 3*c*', 3*d*', 3*e*', 3*f*' are provided. The restraint sections 3*e*', 3*f*' have the protruding portions 10 as previously described with reference to FIG. 14. The restraint sections 3*c*', 3*d*' have grooves 3*g*. End portions of the restraint sections 3*e*', 3*f*' are inserted into the grooves 3*g*, whereby the restraint sections 3*c*', 3*d*' and the restraint sections 3*e*', 3*f*' inserted into the grooves 3*g* are secured to one another. As a result, the restraint section 3' which has a rectangular shape as a whole is formed.

Figure 15B:
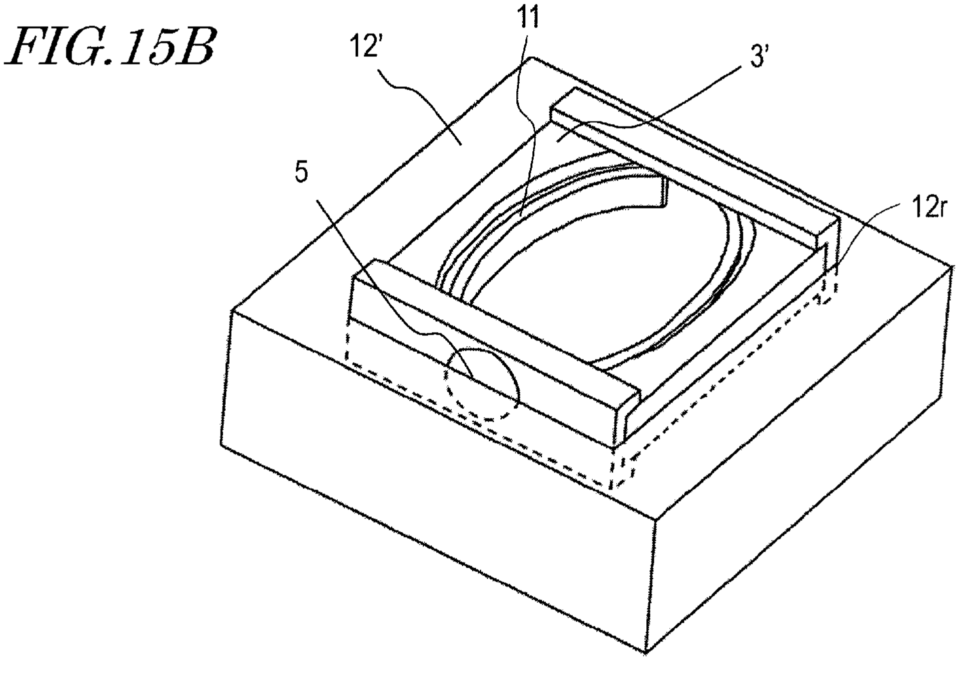

As shown in FIG. 15A, a pair of molds 12, 12' which have recessed portions 12*r* are provided. The restraint section 3' is provided in the recessed portions 12*r*. FIG. 15B shows a state of the restraint section 3' which is provided in the recessed portion 12*r* of the mold 12'. Then, the mold 12 is placed on the mold 12' such that the recessed portions 12*r* meet each other. A sol solution which is a source material of a silica nanoporous element that forms the acousto-optic medium section 2 is supplied through an opening 12*a* of the mold 12 and is subjected to gelation. The produced wet gel is dried by supercritical drying, for example. As a result, an acoustic wave receiving section 1 which has an acousto-optic medium section 2 secured to the restraint section 3' is obtained. In the drying, the wet gel gradually shrinks in the process of forming the silica nanoporous element. Thanks to the use of the restraint section 3', the acousto-optic medium section 2 that is the silica nanoporous element is secured to the restraint section 3' in such a manner that it is kept stretched by the restraint section 3', because of the anchoring effect of the protruding portion 10.

The acoustic wave receiving section 1 which is manufactured as described above improves the handleability of the acousto-optic medium section 2 which is formed by a fragile silica nanoporous element because the acousto-optic medium section 2 is fixed by the restraint section 3'.

(2) Alternative Shapes of the Acousto-Optic Medium Section 2

The acousto-optic medium section 2 is not limited to the shape which has previously been described in the above embodiment but may have various shapes. Hereinafter, a direction which is perpendicular to the principal surfaces 2*a*, 2*b* of the acousto-optic medium section 2 is defined as the thickness direction, and a direction which is perpendicular to the thickness direction and to the propagation direction of the light wave 4 is defined as the width direction. When using an acousto-optic medium section 2 which is shaped to have varying distributions in thickness and width in a cross section perpendicular to the principal surfaces 2*a*, 2*b*, the resonance can be further reduced, and an optical microphone with a flat frequency characteristic can be realized.

Figure 16A:
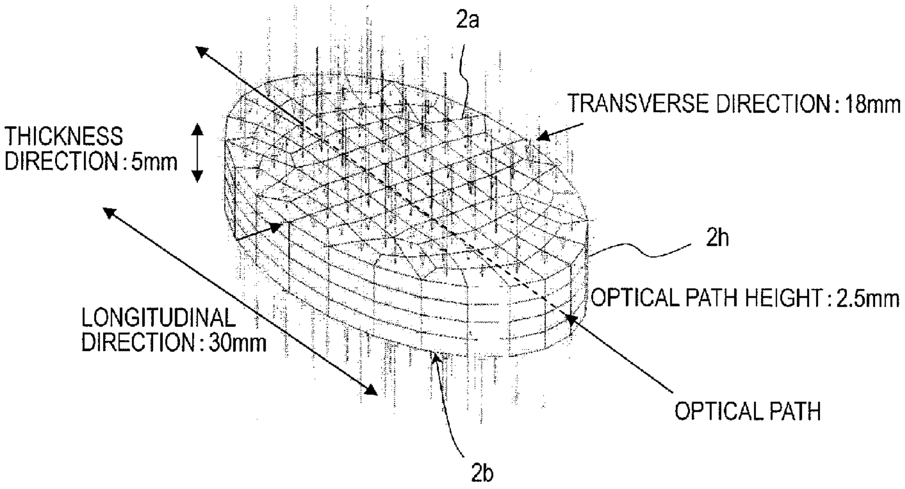
FIG. 16A is a diagram showing the external shape of an acousto-optic medium section which has an elliptical shape.
Figure 16B:
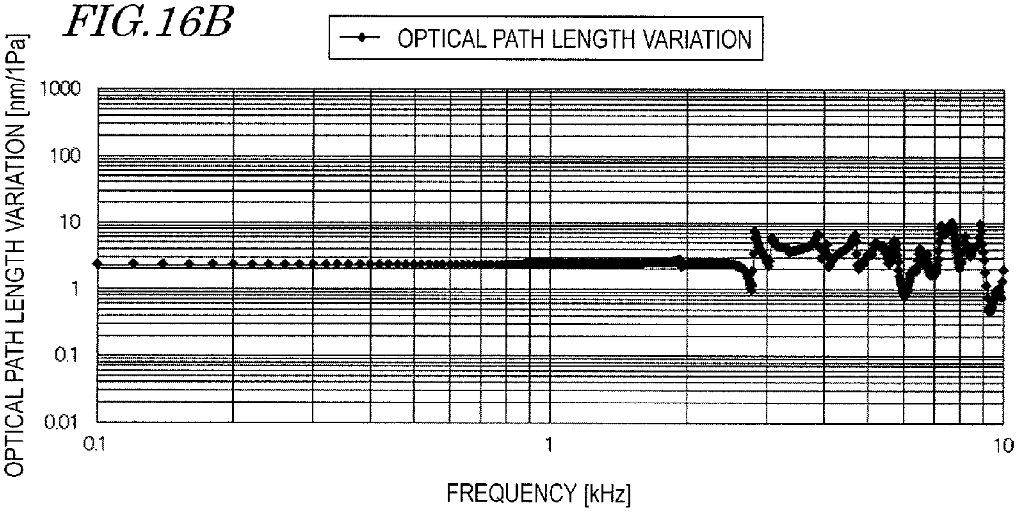
FIG. 16B is a graph showing the frequency characteristic of its optical path length variation.

For example, as shown in FIG. 16, the principal surfaces 2*a*, 2*b* of the acousto-optic medium section 2 may have an elliptical shape. FIG. 16A shows a shape of the acousto-optic medium section 2 which was used for analysis. FIG. 16B shows the relationship between the optical path length variation and the frequency. The acousto-optic medium section 2 shown in FIG. 16A has elliptical principal surfaces 2*a*, 2*b*. The width of the acousto-optic medium section 2 is 18 mm, the length along the optical path is 30 mm, and the thickness is 5 mm. Since the principal surfaces 2*a*, 2*b* have an elliptical shape, the acousto-optic medium section 2 has a single lateral surface 2*h* which has a curved shape. The result of analysis of the acousto-optic medium section 2 of FIG. 16 which was carried out on the assumption that the entire lateral surface 2*h* is in contact with the restraint section 3 is shown in FIG. 16B. As seen from FIG. 16B, it is confirmed that peaks were reduced in the band of 5 kHz to 10 kHz.

Figure 17A:
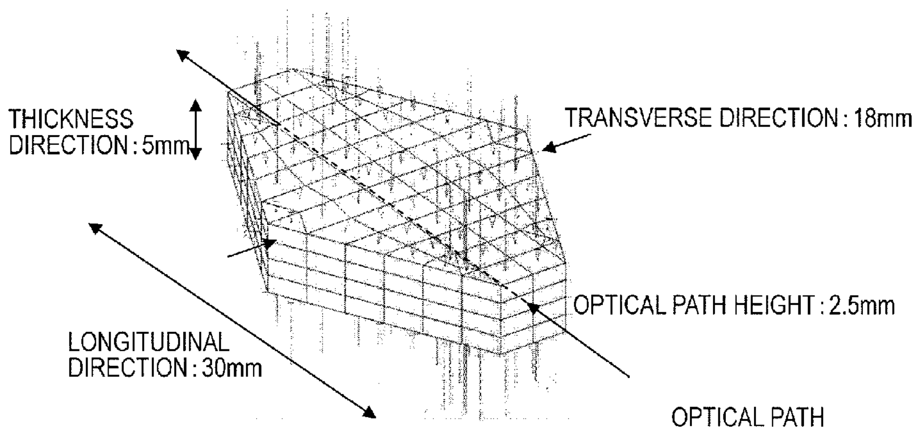
FIG. 17A is a diagram showing the external shape of an acousto-optic medium section which has a rhombic shape.
Figure 17B:
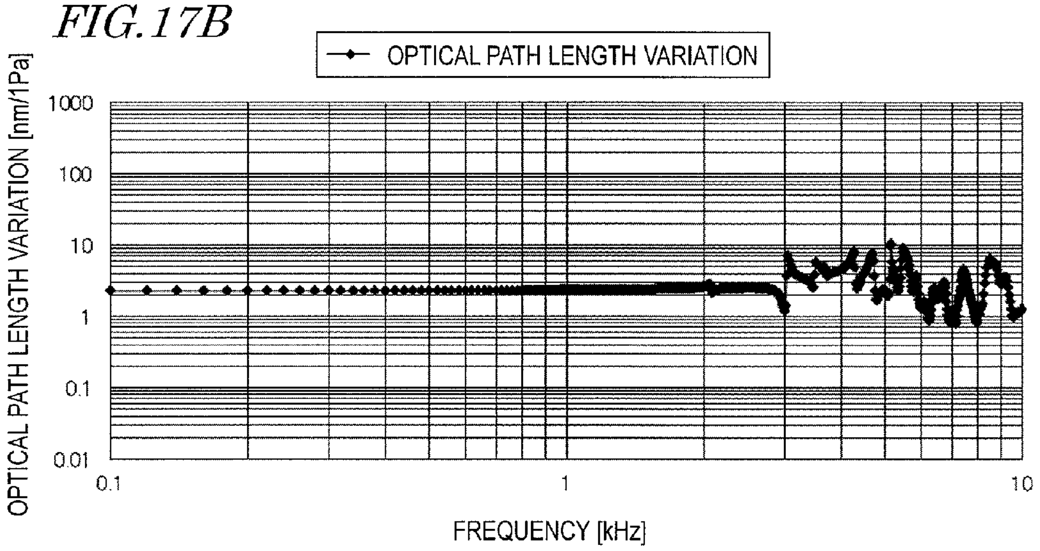
FIG. 17B is a graph showing the frequency characteristic of its optical path length variation.
Figure 18A:
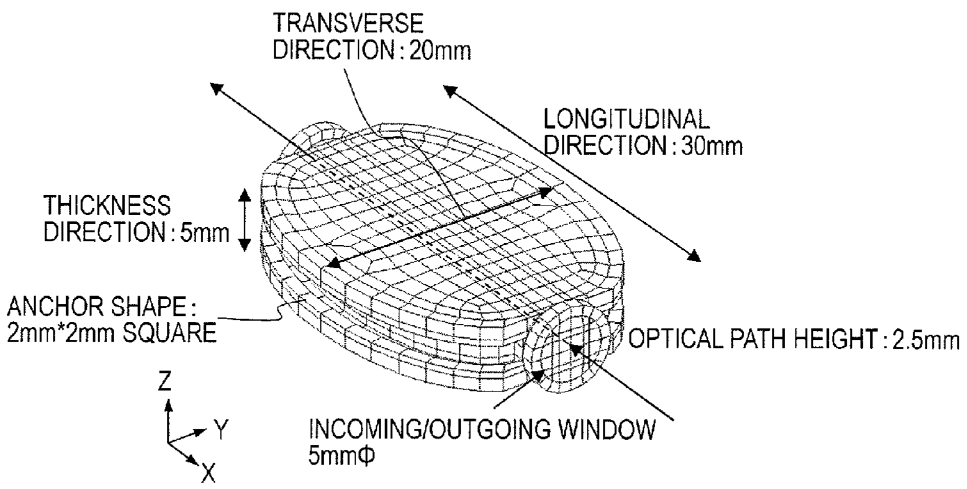
FIG. 18A is a diagram showing the external shape of an acousto-optic medium section which has another elliptical shape.
Figure 18B:
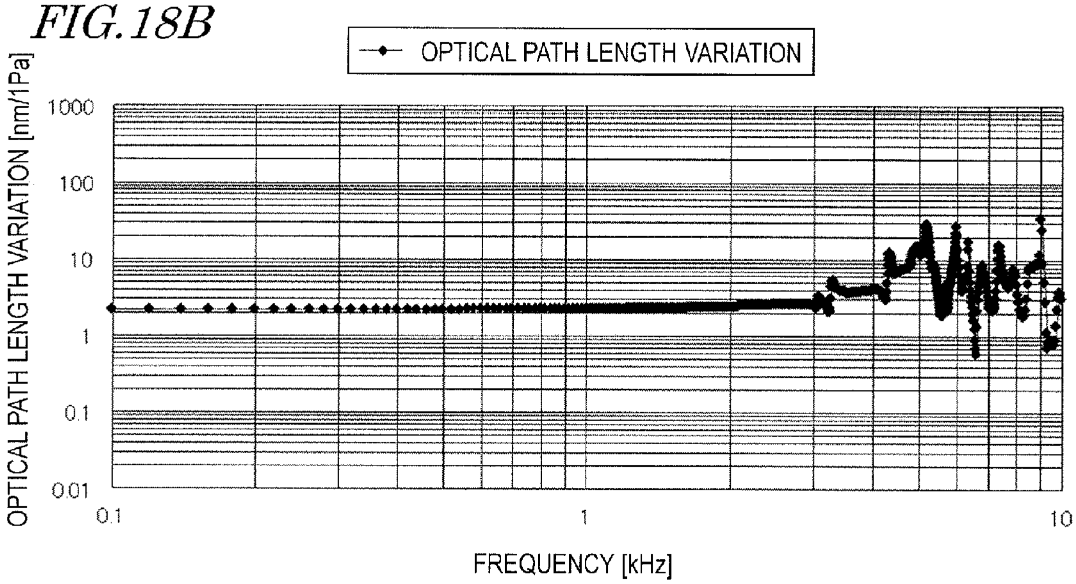
FIG. 18B is a graph showing the frequency characteristic of its optical path length variation.

FIGS. 17A and 17B show a shape of the acousto-optic medium section 2 in which the principal surfaces 2*a*, 2*b* have an octagonal shape obtained by truncating a rhombus at its two longitudinal ends, and the analysis result. The width of the acousto-optic medium section 2 shown in FIG. 17A is 18 mm, the length along the optical path direction is 30 mm, and the thickness is 5 mm. FIG. 17B shows the result of the analysis. A flat frequency characteristic was obtained as in FIG. 16B. As seen from these results, it is inferred that, when the acousto-optic medium section 2 is shaped to have a varying width distribution along the optical path direction, i.e., the width of the acousto-optic medium section 2 varies along the optical path direction, the frequency characteristic of the optical path length variation is further flattened.

FIGS. 18A and 18B and FIGS. 19A and 19B show shapes of the acousto-optic medium section 2 which is supported by the restraint section 3 which has protruding portions and the analysis results, as the lateral surfaces of the acousto-optic medium sections 2 which have the shapes shown in FIG. 16 and FIG. 17 have previously been described with reference to FIG. 13. As seen from FIG. 18B and FIG. 19B, there are some peaks in the frequency characteristic in the band of 5 kHZ to 10 kHz. However, the flatness of the frequency characteristic of the optical path length variation did not greatly deteriorate, and an excellent frequency characteristic was obtained.

Figure 19A:
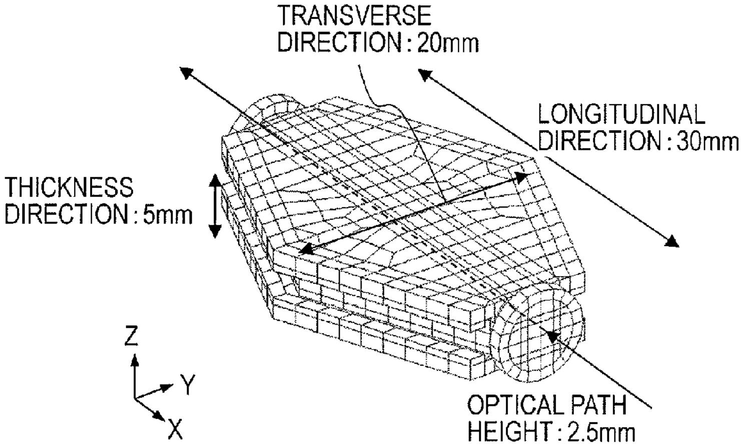
FIG. 19A is a diagram showing the external shape of an acousto-optic medium section which has another rhombic shape.
Figure 19B:
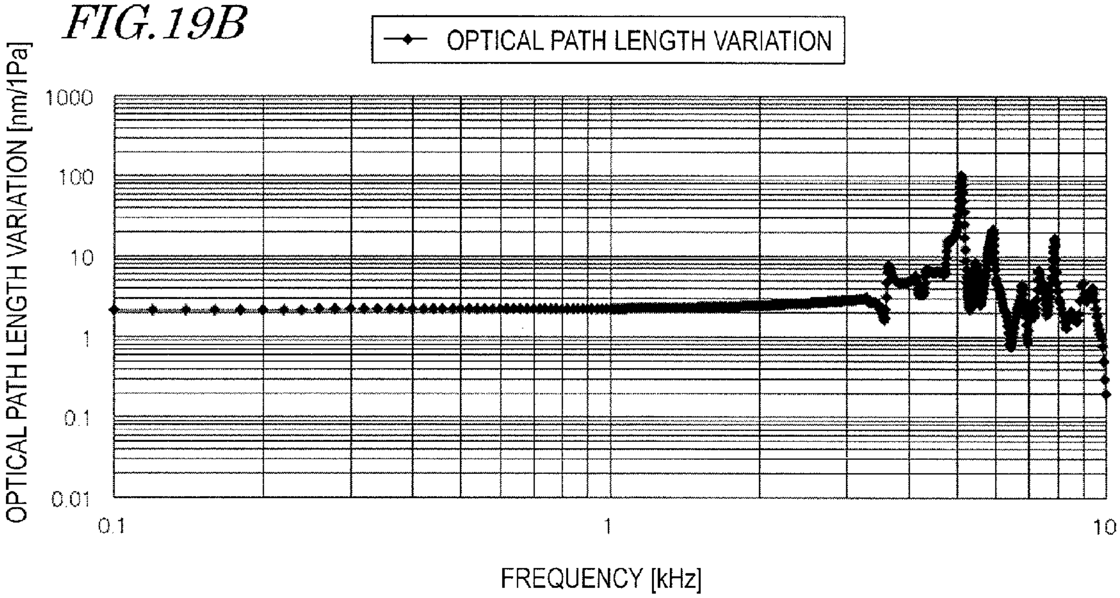
FIG. 19B is a graph showing the frequency characteristic of its optical path length variation.
Figure 20A:
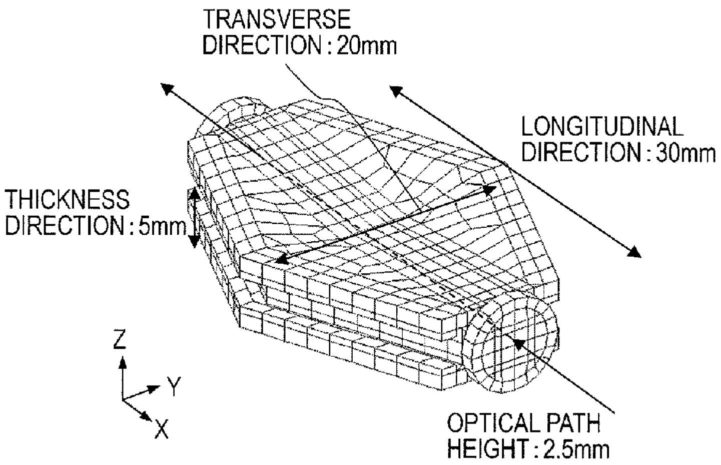
FIG. 20A is a diagram showing the external shape of an acousto-optic medium section which has still another rhombic shape.
Figure 20B:
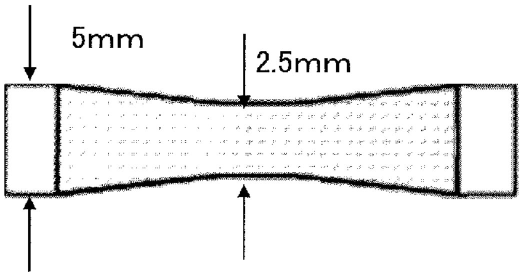
FIG. 20B is a diagram showing its cross section.

The width of the acousto-optic medium section 2 may have a varying distribution along the thickness direction. The shapes of FIGS. 20A, 20B, and 20C and FIGS. 21A, 21B, and 21C are the same as that of the acousto-optic medium section 2 shaped as shown in FIG. 19A except that thickness varies along the width direction and the optical path direction. Specifically, the thickness of the acousto-optic medium section 2 shown in FIG. 20A is greater at the opposite ends than at the center when seen along the width direction and the optical path direction as shown in FIG. 20B. On the other hand, the thickness of the acousto-optic medium section 2 shown in FIG. 21A is smaller at the opposite ends than at the center when seen along the width direction and the optical path direction as shown in FIG. 21B.

Figure 20C:
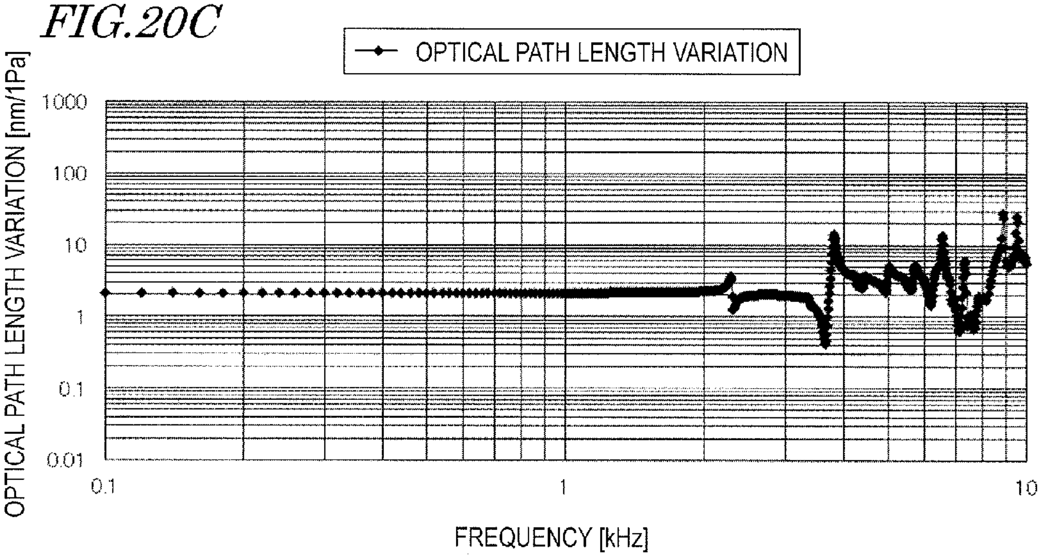
FIG. 20C is a graph showing the frequency characteristic of its optical path length variation.
Figure 21A:
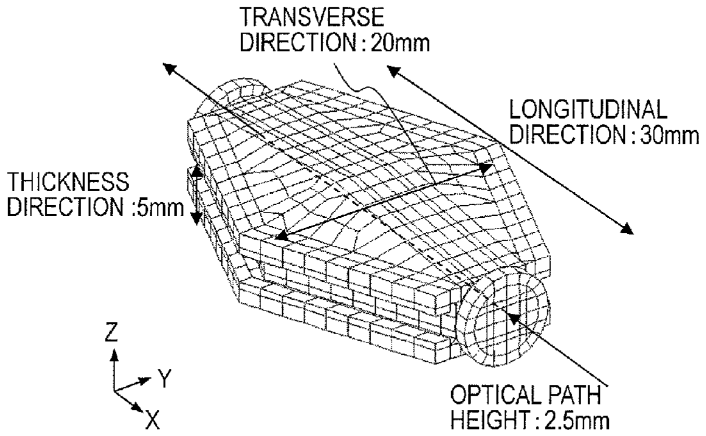
FIG. 21A is a diagram showing the external shape of an acousto-optic medium section which has still another rhombic shape.
Figure 21B:
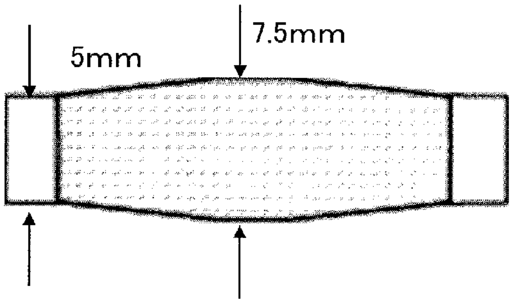
FIG. 21B is a diagram showing its cross section.
Figure 21C:
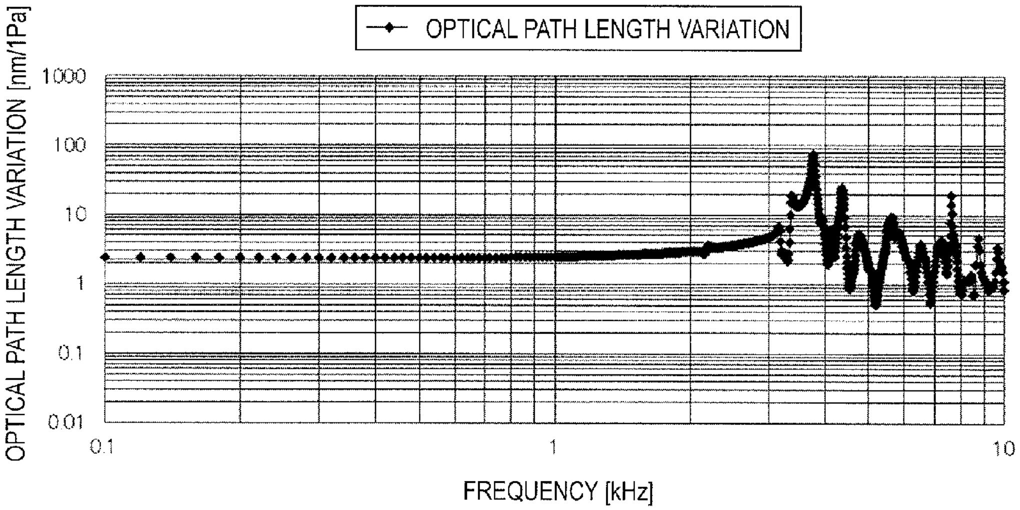
FIG. 21C is a graph showing the frequency characteristic of its optical path length variation.

FIGS. 20C and 21C show the analysis results of the acousto-optic medium sections 2 having the above-describes shapes. As seen from FIGS. 20C and 21C, in the case where the thickness varies along the width direction and the optical path direction, i.e., along the directions parallel to the principal surfaces 2*a*, 2*b*, obtained frequency characteristics are flatter than that achieved in a case where the thickness does not vary. As described herein, the acousto-optic medium section 2 can have various shapes in order to improve the flatness of the frequency characteristic of the optical path length variation.

(3) Other Embodiments for Detecting the Optical Path Length Variation

In the above-described embodiments, for the purpose of detecting the optical path length variation of the acousto-optic medium section 2, the light emitting section 101 and the light receiving section 102 of the optical interferometer are provided such that the acousto-optic medium section 2 is interposed therebetween. Detection of the optical path length variation in the acousto-optic medium section 2 may be realized in different ways.

Figure 22A:
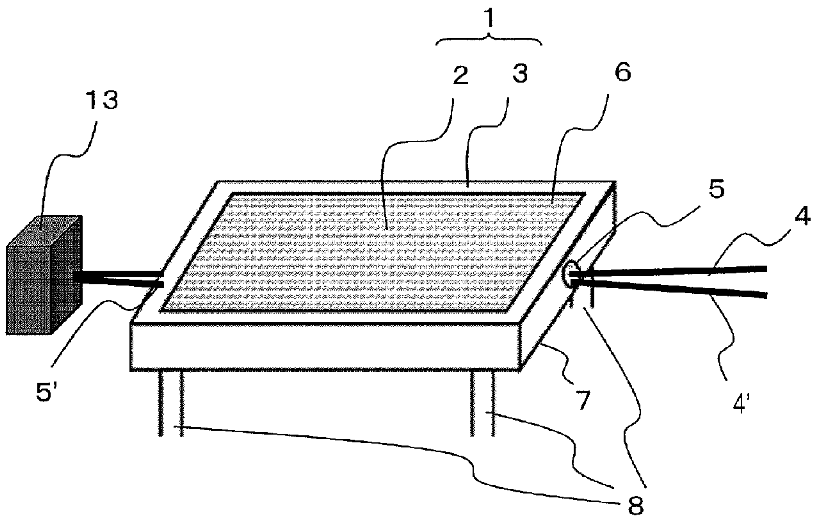
FIGS. 22A and 22B are diagrams showing other optical paths of a light wave transmitted through the acousto-optic medium section.

First, in order to detect the optical path length variation of the acousto-optic medium section 2, the light wave 4 emitted from the light emitting section 101 may be allowed to go and return through the acousto-optic medium section 2. Specifically, as shown in FIG. 22A, a mirror 13 is provided in the vicinity of an opening 5' which is opposite to one opening 5 of the restraint section 3, and the light wave 4 is allowed to come into the acousto-optic medium section 2 from the opening 5. The light wave 4 transmitted through the acousto-optic medium section 2 goes out from the opening 5' and is then reflected by the mirror 13. The reflection from the mirror 13, which is a light wave 4', comes into the acousto-optic medium section 2 from the opening 5'. The light wave 4' is again transmitted through the acousto-optic medium section 2 and goes out from the opening 5. This light wave 4' is detected at the light receiving section 102.

Figure 22B:
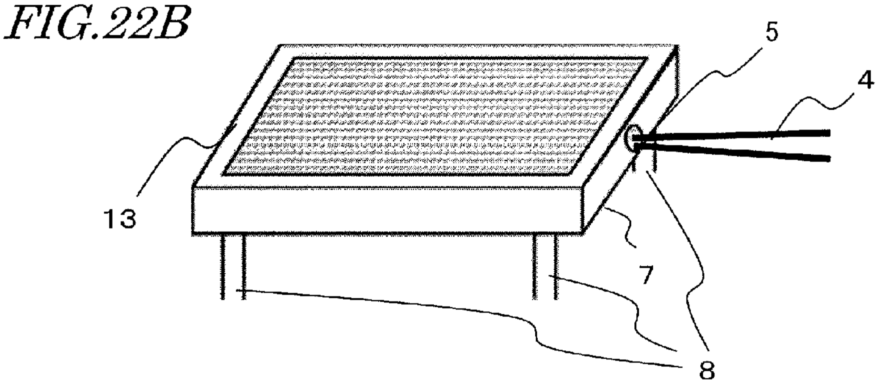

With the above-described configuration, the distance that the light waves 4, 4' propagate through the acousto-optic medium section 2, i.e., the optical path length, can be increased, and the optical path length variation also increases. Therefore, the sensitivity of the optical microphone can be improved. Further, as shown in FIG. 22B, the mirror 13 may be provided at a position so as to be in contact with the acousto-optic medium section 2, instead of providing the opening 5' in the restraint section 3. With such a configuration, also, a long optical path length can be realized, and the sensitivity of the optical microphone can be improved.

Second Embodiment

Figure 23:
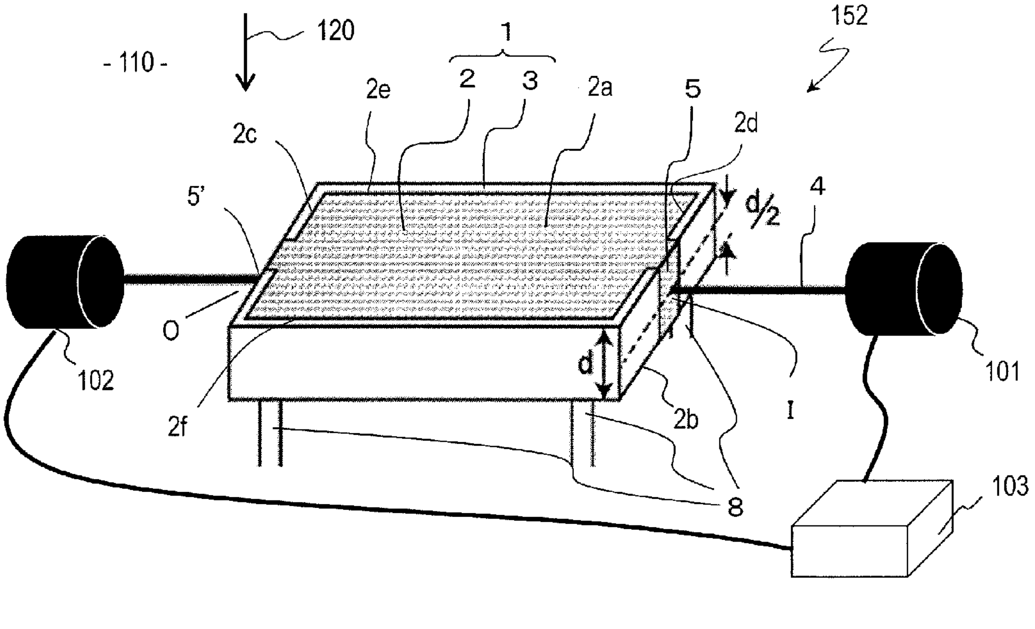
FIG. 23 is a diagram showing the essential part of the second embodiment of the optical microphone of the present invention.

Hereinafter, the second embodiment of an optical microphone of the present invention is described with reference to the drawings. FIG. 23 schematically shows the configuration of the essential part of the second embodiment of the optical microphone of the present invention. The optical microphone 152 shown in FIG. 23 includes, as in the first embodiment, an acoustic wave receiving section 1, which includes an acousto-optic medium section 2 and a restraint section 3, and a light emitting section 101. The light emitting section 101 and a light receiving section 102 are constituents of an optical interferometer 103. The acoustic wave receiving section 1 is in contact with an environmental fluid 110. An acoustic wave 120 propagating through the environmental fluid 110 comes into the acoustic wave receiving section 1. A light wave 4 emitted from the light emitting section 101 passes through the acoustic wave receiving section 1. In the acoustic wave receiving section 1, the optical path length of the light wave is varied by the acoustic wave 120 that has come in, and therefore, the acoustic wave is detected by detecting this optical path length variation. That is, the acoustic wave is detected using the light wave. One of the major features of the optical microphone 152 resides in that the optical path of the light wave passes through the center of the acoustic wave receiving section 1, and this configuration realizes a flatter frequency characteristic than those achieved in conventional optical microphones. Since the method of detecting an acoustic wave by means of a light wave can be realized by, for example, a known detection method such as disclosed in Patent Document 1, the configuration of the acoustic wave receiving section 1 which realizes a flat frequency characteristic is particularly described in detail in the following embodiments. The environmental fluid 110 is a gas or liquid. For example, the environmental fluid 110 may be air or water.

1. Configuration of the Optical Microphone 152

(1) Acousto-Optic Medium Section 2

The acousto-optic medium section 2 receives the acoustic wave 120 from the environmental fluid 110 and allows the acoustic wave 120 to propagate through the acousto-optic medium section 2. The acoustic wave 120 is a compression wave, and therefore, the density of the acousto-optic medium section 2 varies in a region through which the acoustic wave 120 is propagating, resulting in occurrence of a refractive index variation. The acousto-optic medium section 2 may be made of a material which has a small difference in acoustic impedance from the environmental fluid such that the acoustic wave 120 is efficiently taken into the acousto-optic medium section 2 across the interface between the environmental fluid 110 and the acousto-optic medium section 2, while reducing reflection of the acoustic wave 120 at the interface as much as possible. For example, when a silica nanoporous element (dry silica gel) is used as the material for the acousto-optic medium section 2, the difference in acoustic impedance from air is small, so that the acoustic wave 120 propagating through the air can be taken into the acousto-optic medium section 2 with high efficiency. The sound velocity of the silica nanoporous element is about from 50 m/sec to 150 m/sec, which is smaller than the sound velocity in the air, 340 m/sec. The density of the silica nanoporous element is also small, which is about from 70 kg/m$^3$ to 280 kg/m$^3$. Therefore, the acoustic impedance of the silica nanoporous element is about 8 to 100 times that of the air, i.e., the difference in acoustic impedance is small, and the reflection at the interface is small, so that the acoustic wave in the air can be efficiently taken into the silica nanoporous element. For example, when a silica nanoporous element with the sound velocity of 50 m/sec and the density of 100 kg/m$^3$ is used for the acousto-optic medium section 2, the reflection at the interface with the air is 70%, while about 30% of the energy of the acoustic wave is taken into the acousto-optic medium section 2 without being reflected.

When a silica nanoporous element is used as the material for the acousto-optic medium section 2, the refractive index variation Δn for the light wave can be greater than in the case of using a different material. For example, the refractive index variation Δn of the air for the acoustic pressure variation of 1 Pa is $2.0\times10^{-9}$, while the refractive index variation Δn of the silica nanoporous element for the acoustic pressure variation of 1 Pa is about $1.0\times10^{-7}$, which is greater than the former.

The acousto-optic medium section 2 has a pair of principal surfaces 2*a*, 2*b* and at least one lateral surface which is provided between the pair of principal surfaces 2*a*, 2*b* as shown in FIG. 23. In the present embodiment, the principal surfaces 2*a*, 2*b* have a rectangular shape, and therefore, the acousto-optic medium section 2 has four lateral surfaces 2*c*, 2*d*, 2*e*, 2*f*. The principal surfaces refer to one of a plurality of faces that form the three-dimensional shape of the acousto-optic medium section 2 which has the largest area and another one of the plurality of faces which has the second largest area. In the present embodiment, the principal surface 2*a* and the principal surface 2*b* have the same shape. In any cross section which is perpendicular to the principal surfaces 2*a*, 2*b*, the thickness along the direction that is perpendicular to the principal surfaces 2*a*, 2*b* is constant. The principal surfaces 2*a*, 2*b* are surfaces through which the acoustic wave 120 is taken into the acousto-optic medium section 2 from the environmental medium 110.

The shape of the acousto-optic medium section 2 is not limited to the above-described shape, but various shapes may be used for the acousto-optic medium section 2. Alternative shapes of the acousto-optic medium section 2 will be described later.

The size of the acousto-optic medium section 2 depends on the use of the optical microphone 152, the frequency of the acoustic wave 120 to be detected, the material that forms the acousto-optic medium section 2, etc.

(2) Restraint Section 3

The restraint section 3 is in contact with the acousto-optic medium section 2 so as to prevent a shape change of the acousto-optic medium section 2. The pair of principal surfaces 2*a*, 2*b* of the acousto-optic medium section are in contact with the environmental fluid 110 through which the acoustic wave 120 to be detected is propagating and are capable of freely vibrating. Therefore, the restraint section 3 may be in contact with at least one lateral surface of the acousto-optic medium section 2, excluding the pair of principal surfaces 2*a*, 2*b*, so as to prevent a shape change in the lateral surface of the acousto-optic medium section 2. The direction in which the restraint section 3 prevents a shape change of the acousto-optic medium section 2 may be all of the directions which are perpendicular to the propagation direction of the acoustic wave 120 or may be a single arbitrary direction which is perpendicular to the propagation direction of the acoustic wave. In the present embodiment, the restraint section 3 is provided at the four lateral surfaces 2*c*, 2*d*, 2*e*, 2*f* of the acousto-optic medium section 2 and are in contact with these lateral surfaces so as to prevent a shape change of the acousto-optic medium section 2 in all of the directions which are perpendicular to the propagation direction of the acoustic wave 120. In the present embodiment, the restraint section 3 has a shape of a frame which has four inside lateral surfaces that are in contact with the four lateral surfaces 2*c*, 2*d*, 2*e*, 2*f*.

The restraint section 3 may have a greater elastic modulus than the acousto-optic medium section 2 in order to prevent a shape change of the acousto-optic medium section 2. The restraint section 3 may be made of a material which is transparent to the light wave 4 emitted from the light emitting section 101, such as glass, an acrylic material, or the like. Alternatively, the restraint section 3 may be made of a non-transparent material, such as a metal, Teflon (registered trademark), or the like. Note that, however, when the restraint section 3 is made of a material which is not transparent to the light wave 4, the restraint section 3 may have at least one opening through which the light wave 4 comes into the acousto-optic medium section 2 and the light wave 4 transmitted through the acousto-optic medium section 2 goes out from the acousto-optic medium section 2. In the present embodiment, the restraint section 3 have openings 5, 5' at positions corresponding to the lateral surfaces 2*c*, 2*d* of the acousto-optic medium section 2.

Figure 24:
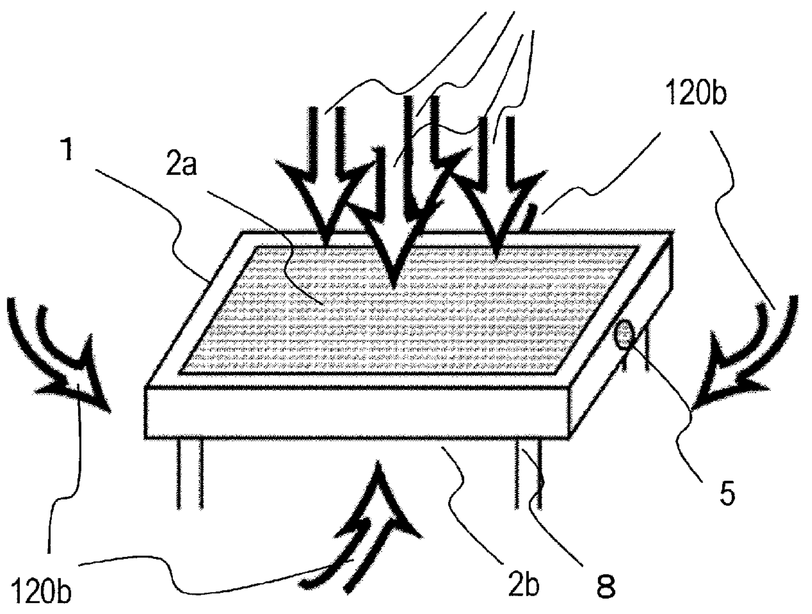
FIG. 24 is a diagram illustrating incoming of an acoustic wave onto an acoustic wave receiving section.

In the acoustic wave receiving section 1 that is formed by the acousto-optic medium section 2 and the restraint section 3, the acoustic wave 120 can come into the acoustic wave receiving section 1 from the principal surfaces 2*a*, 2*b*. Of the acoustic wave 120 propagating through the environmental fluid 110, a portion comes into the acousto-optic medium section 2 from the principal surface 2*a*, while part of another portion of the acoustic wave 120 which does not come into the acousto-optic medium section 2 from the principal surface 2*a* makes a detour to come into the acousto-optic medium section 2 from the principal surface 2*b* as shown in FIG. 24. The two principal surfaces 2*a*, 2*b* may be free ends which are capable of vibrating. The lateral surfaces 2*c*, 2*d*, 2*e*, 2*f* that are in contact with the restraint section can be regarded as fixed ends which are prevented from vibrating. A case for supporting the acoustic wave receiving section 1 may be provided to the restraint section 3 so as not to be in contact with the two principal surfaces 2*a*, 2*b*. For example, supporting sections 8 may be attached to the restraint section 3, and gaps may be provided between the case and the two principal surfaces 2*a*, 2*b* such that the principal surfaces 2*a*, 2*b* are in contact with the environmental fluid 110.

Fixing of the acousto-optic medium section 2 may be realized by adhering together the acousto-optic medium section 2 and the restraint section 3 using an adhesive agent, or the like. Alternatively, the acousto-optic medium section 2 may be fixed by fastening the lateral surfaces using a fastening mechanism provided in the restraint section 3. For example, the acousto-optic medium section 2 is bound by the restraint section 3 between the lateral surface 2*c* and the lateral surface 2*d* and between the lateral surface 2*e* and the lateral surface 2*f*.

(3) Light Emitting Section 101, Light Receiving Section 102, Optical Interferometer 103

When the acoustic wave 120 comes into the acousto-optic medium section 2, the density distribution of the acousto-optic medium section 2 propagates according to propagation of the acoustic wave 120 that is a longitudinal wave, resulting in occurrence of a refractive index variation. To detect this refractive index variation, the light wave 4 emitted from the light emitting section 101 is allowed to come into the acousto-optic medium section 2 so as to propagate through the acousto-optic medium section 2 between the principal surfaces 2*a*, 2*b*. A variation in the optical path length of the light wave 4 propagating through the acousto-optic medium section 2 is detected, whereby the acoustic wave 120 is detected. The optical microphone 152 of the present embodiment uses the optical interferometer 103 in order to detect the optical path length variation of the light wave 4. Specifically, the light wave 4 is emitted from the light emitting section 101 of the optical interferometer and detected by the light receiving section 102, whereby a phase variation of the light wave 4 propagating through the acousto-optic medium section 2 is detected. By this process, the optical path length variation of the light wave 4 in the acousto-optic medium section 2 can be detected. Examples of the optical interferometer for detecting the optical path length variation include a heterodyne interferometer, a homodyne interferometer such as a Mach-Zehnder interferometer, a laser Doppler vibrometer, etc.

In the optical microphone 152 of the present embodiment, the light wave 4 emitted from the light emitting section may come into the acousto-optic medium section 2 at a position I that is equidistant from the pair of principal surfaces 2*a*, 2*b* when seen along a direction perpendicular to the pair of principal surfaces 2*a*, 2*b*. The light wave 4 which has transmitted through the acoustic medium section 2 may go out from the acousto-optic medium section 2 at a position O that is equidistant from the pair of principal surfaces 2*a*, 2*b*. Where a direction which is perpendicular to the principal surfaces 2*a*, 2*b* is defined as the thickness direction and the thickness of the acoustic medium section 2 is d, both the position I and the position O are distant from the principal surfaces 2*a*, 2*b* by d/2. As described below, by setting the optical path of the light wave 4 so as to meet this condition, a flatter frequency characteristic than those achieved in conventional optical microphones can be realized.

2. Operation and Analysis Results of the Optical Microphone 152

When the acoustic wave 120 comes into the acousto-optic medium section 2 of the optical microphone 152 of the present embodiment and then propagates therethrough, the acoustic pressure which is applied at the time of incoming of the acoustic wave 120 deforms the acousto-optic medium section 2, causing a dimensional change. Due to this dimensional change, an optical path length variation occurs in the acousto-optic medium section 2. Further, after having come into the acousto-optic medium section 2, the acoustic wave 120 propagates through the acousto-optic medium section to cause a refractive index variation. In the optical microphone 152, both the optical path length variation which is attributed to the dimensional change of the acousto-optic medium section 2 and the refractive index variation which is attributed to the propagation of the acoustic wave are considered in order to realize a flatter frequency characteristic than those achieved in conventional optical microphones.

Figure 25:
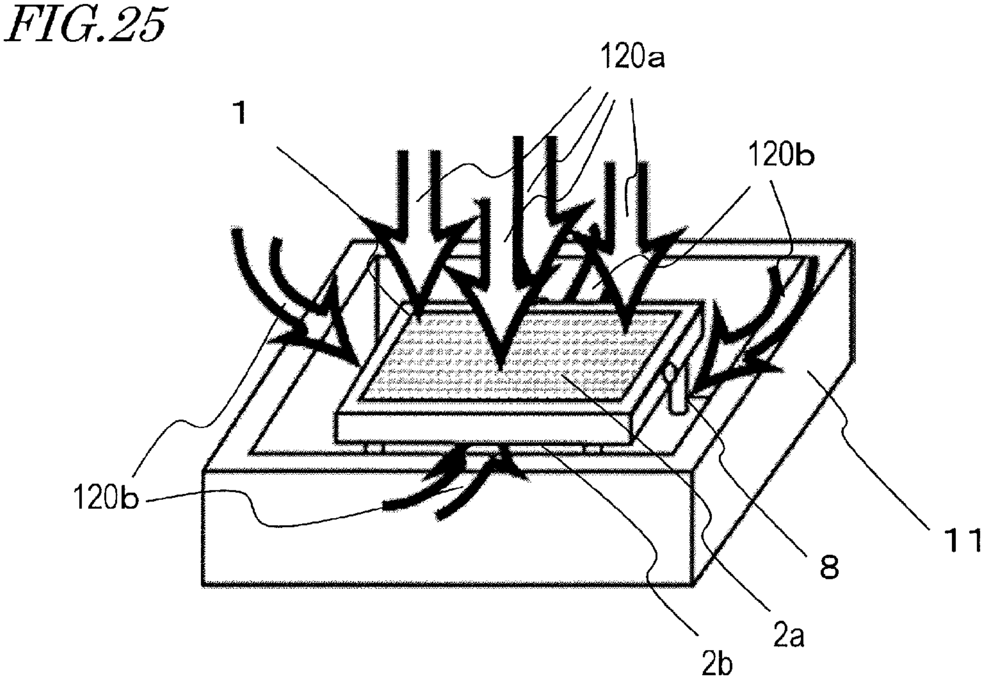
FIG. 25 is another diagram illustrating incoming of an acoustic wave onto an acoustic wave receiving section.

In the acoustic wave receiving section 1, the lateral surfaces 20, 2*d*, 2*e*, 2*f* of the acousto-optic medium section 2, excluding the principal surfaces 2*a*, 2*b*, are fixed by the restraint section 3, and the acoustic wave 120 comes in only from the principal surfaces 2*a*, 2*b*. In the case where the acoustic wave 120 propagating through the environmental fluid 110 comes in from the above of the principal surface 2*a*, an acoustic wave 120*a* is directly incident on the principal surface 2*a* while an acoustic wave 120*b* makes a detour to the underside so as to be incident on the principal surface 2*b* as shown in FIG. 24. Therefore, the acoustic wave 120*a* which comes in from the principal surface 2*a* and the acoustic wave 120*b* which comes in from the principal surface 2*b* have different acoustic pressures. This tendency is more noticeable when the acoustic wave receiving section 1 is contained inside a case 11 as shown in FIG. 25.

As a result of the research conducted by the inventors of the present application, when the acoustic waves 120 which are incident on the principal surface 2*a* and the principal surface 2*b* have different acoustic pressures, a dimensional change occurs in a direction perpendicular to the principal surfaces 2*a*, 2*b* of the acousto-optic medium section due to flexure of the acousto-optic medium section 2. Therefore, it was found that, at the resonant frequency that is determined according to the shape or size of the acousto-optic medium section 2, the flatness of the frequency characteristic is marred by the flexural resonance in the thickness direction.

As described hereinbelow, an analysis was carried out using a finite element method for the purpose of examining the flexural resonance in the acousto-optic medium section 2. The analytical models and results are shown in FIG. 26 to FIG. 29.

Figure 26A:
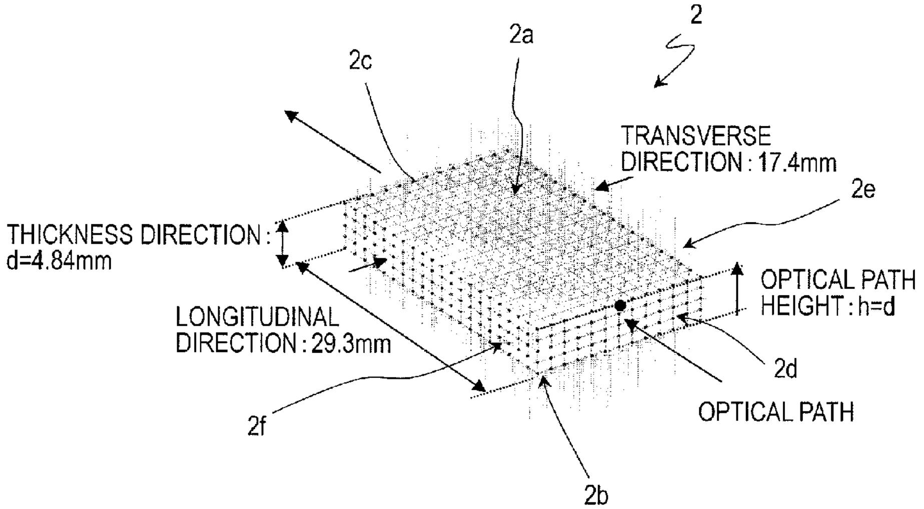
FIG. 26A is a diagram showing a shape and analytical model of an acousto-optic medium section used in analysis.
Figure 27A:
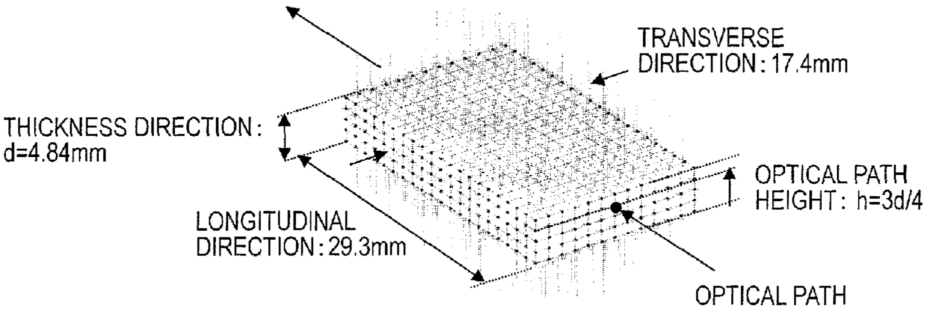
FIG. 27A is a diagram showing a shape and analytical model of an acousto-optic medium section used in analysis.
Figure 28A:
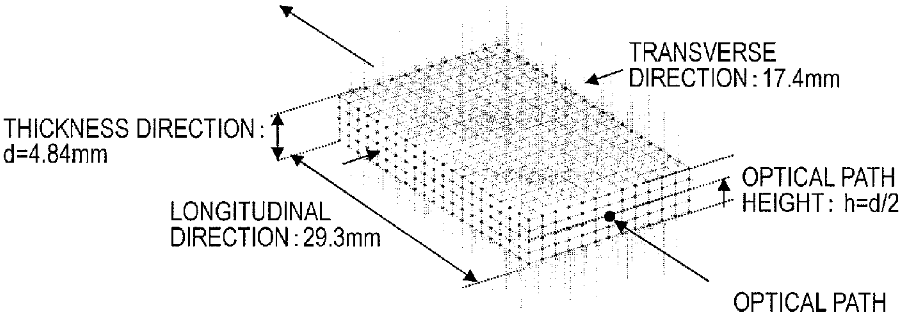
FIG. 28A is a diagram showing a shape and analytical model of an acousto-optic medium section used in analysis.

As shown in FIG. 26A, an acousto-optic medium section 2 which was in the shape of a rectangular parallelepiped was used for the analysis. Specifically, as shown in FIG. 26A, the acousto-optic medium section 2 with the dimensions of 29.3 mm (longitudinal direction)×17.4 mm (transverse direction)×4.84 mm (thickness direction) was used. The optical path of the acousto-optic medium section 2 was configured to extend along the longitudinal direction of the rectangular parallelepiped. The optical path in the acousto-optic medium section 2 was configured to penetrate through the lateral surfaces 2*c*, 2*d* that face each other in the longitudinal direction. Specifically, in the analysis, the optical path was parallel to the lateral surfaces 2*e*, 2*f* and equidistant from the lateral surfaces 2*e*, 2*f*, and the height h of the optical path from the principal surface 2*b* was h=d, 3d/4, and d/2 as shown in FIG. 26A, FIG. 27A, and FIG. 28A, respectively.

The material of the acousto-optic medium section 2 used in the simulation was a silica nanoporous element with the modulus of longitudinal elasticity of 0.2402 MPa, the Poisson's ratio of 0.24, and the density of 0.108 g/cm$^3$. The attenuation coefficient of the acousto-optic medium section 2 was 0.0084 at 790 Hz, and 0.059 at 40 kHz. The acoustic pressure of the acoustic wave 120*a* that comes in from the principal surface 2*a* was 1 Pa, and the acoustic pressure of the acoustic wave 120*b* that comes in from the principal surface 2*b* was 0.9 Pa.

Figure 26B:
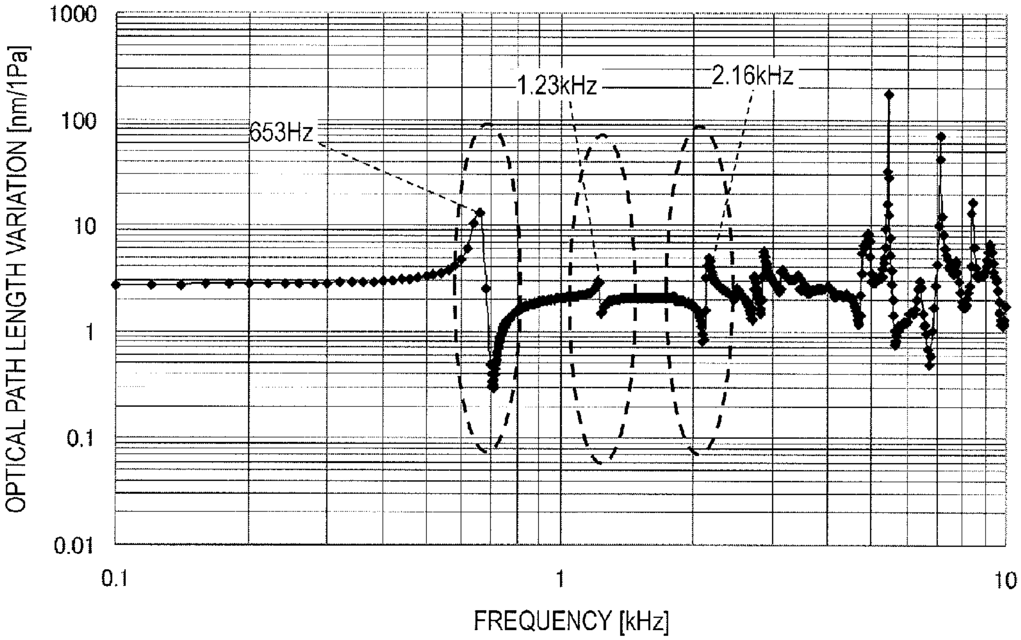
FIG. 26B is a graph of the result of the analysis where the optical path height h is d (h=d), showing the frequency characteristic of an optical path length variation which is attributed to a refractive index variation.
Figure 27B:
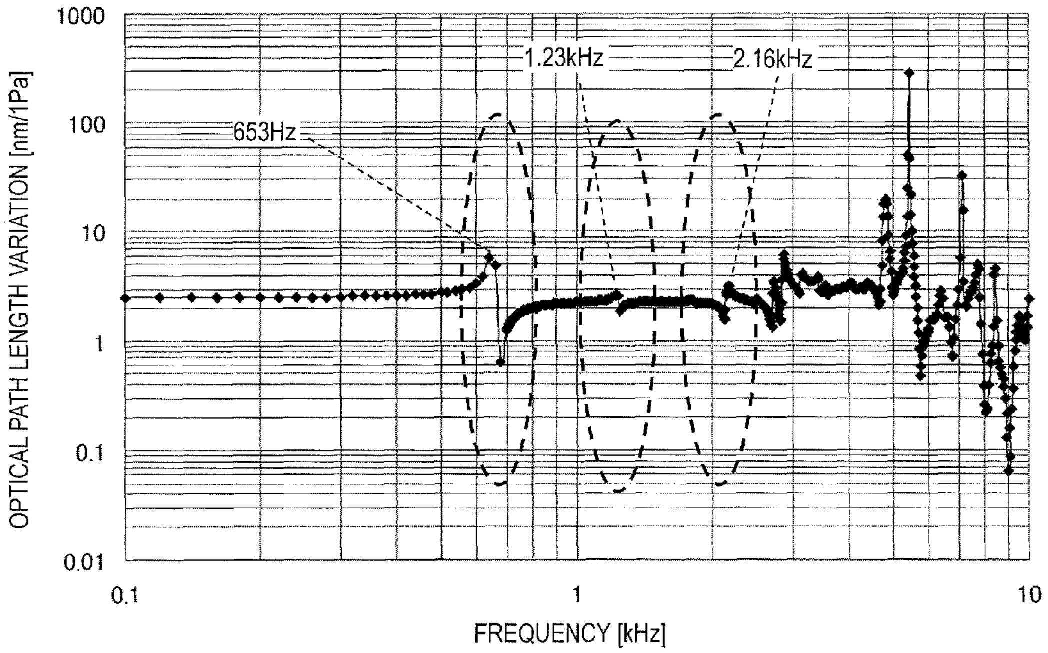
FIG. 27B is a graph of the result of the analysis where the optical path height h is 3d/4 (h=3d/4), showing the frequency characteristic of an optical path length variation which is attributed to a refractive index variation.
Figure 28B:
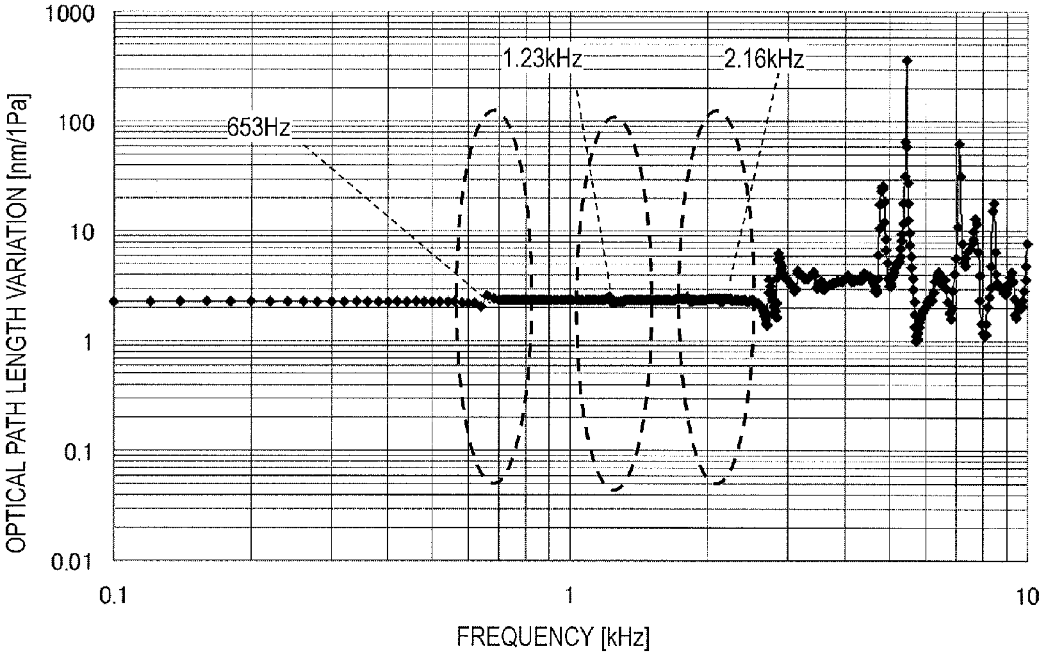
FIG. 28B is a graph of the result of the analysis where the optical path height h is d/2 (h=d/2), showing the frequency characteristic of an optical path length variation which is attributed to a refractive index variation.
Figure 29A:
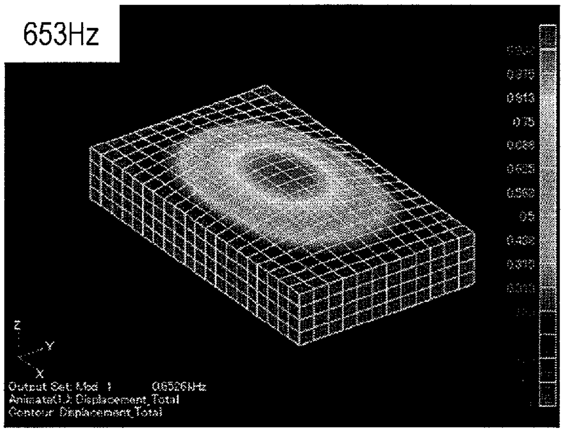
FIGS. 29A to 29C are diagrams showing the results of the analysis of the vibration mode.
Figure 29B:
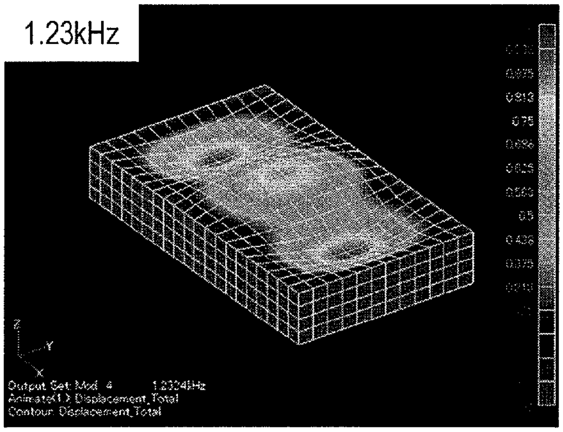
Figure 29C:
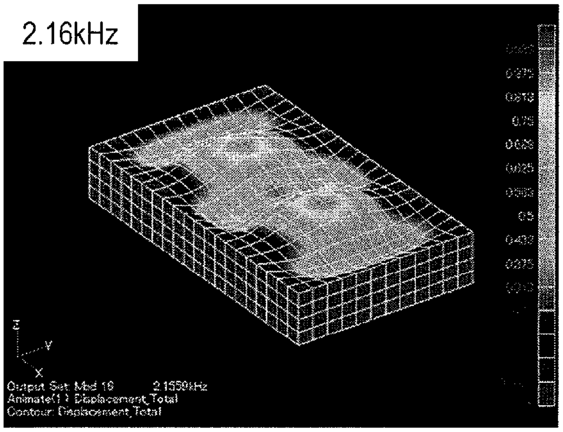

FIG. 26B, FIG. 27B, and FIG. 28B show the frequency dependences of the optical path length variation in the case where the height h from the principal surface 2*b* was d, 3d/4, and d/2, respectively. As seen from FIG. 26B, in the case where h=d, there are peaks and dips near 635 Hz, 1.23 kHz, and 2.16 kHz. This is probably because the acoustic wave 1 resonates in the acousto-optic medium section 2. To know what resonance occurs at the respective frequencies, the vibration mode of the acousto-optic medium section 2 at the respective frequencies was analyzed. The results are shown in FIGS. 29A, 29B, and 29C. As seen from FIGS. 29A, 29B, and 29C, at 653 Hz, there is a fundamental resonance mode in the acousto-optic medium section 2 which is attributed to flexure in the thickness direction. At 1.23 kHz and 2.16 kHz, there is a high-order resonance mode which is attributed to flexure in the thickness direction. It was confirmed that, at the respective frequencies, peaks and dips emerge due to the flexural resonance in the thickness direction, and the flatness of the frequency characteristic is marred.

FIG. 27B and FIG. 28B show the results in the case where the height h of the optical path was 3d/4 and d/2, respectively. As seen from FIG. 27B, there are peaks and dips at 635 Hz, 1.23 kHz, and 2.16 kHz due to resonance, as in the case of h=d (FIG. 26B). However, the largeness of the peaks and dips is relatively small as compared with FIG. 26B, so that it can be confirmed that the resonance was reduced. In the case where the height h of the optical path is d/2, it can be confirmed from FIG. 28B that the peaks and dips which are attributed to resonance were almost prevented.

Among the above analyses, the shape of the acousto-optic medium section 2 and the incidence condition of the acoustic wave are the same. Therefore, it is not because the flexural resonance in the thickness direction in the acousto-optic medium section 2 was reduced. In the optical microphone, the physical quantity which is detected by making the acousto-optic medium section 2 receive the light wave 4 is the sum of the optical path length variation which is attributed to the flexure (dimensional change) of the acousto-optic medium section 2 in the optical path of the light wave 3 propagating through the acousto-optic medium section 2 and the optical path length variation which is attributed to the refractive index distribution variation of the acousto-optic medium section 2. As for the acoustic wave 120 propagating through the acousto-optic medium section 2, when there is flexure in the thickness direction, the acousto-optic medium section 2 has a portion in which the optical path length is elongated due to the flexure and another portion in which the optical path length is shortened on the contrary. In the portion in which the optical path length is elongated, the density of the acousto-optic medium section 2 decreases. In the portion in which the optical path length is shortened, the density of the acousto-optic medium section 2 increases. (The dimensional change in the optical path direction would not occur because it is prevented by the restraint section. The optical path length variation is attributed to the refractive index variation which results from the density variation caused by the flexure.) In the case where a portion of the acousto-optic medium section 2 in which the optical path length variation is a positive variation and a portion of the acousto-optic medium section 2 in which the optical path length variation is a negative variation are in equilibrium and, when totaled, the optical path length variation due to the flexure is canceled between the positive side and the negative side, the effect of the optical path length variation due to the flexure is greatly reduced. As a result of the analyses, it was found that the optical path length variation due to the flexure is canceled when the optical path is on a plane where the height h is d/2, so that the flattest frequency characteristic can be obtained.

As described above, when the height h of the optical path is d/2, the optical path length variation which is attributed to the flexure is canceled so that it is less likely to be affected. This is not limited to a case where the principal surface 2*a* and the principal surface 2*b* are parallel to each other, but may occur so long as the acousto-optic medium section 2 is in plane symmetry and the symmetry plane is between the principal surface 2*a* and the principal surface 2*b*.

From the above-described analysis results, it can be seen that the effect which is attributed to the flexure can be reduced, and an optical microphone which has a flat frequency characteristic can be realized, so long as the height h of the optical path of the light wave 4 is at a portion which is higher than the principal surface 2*b* of the acousto-optic medium section 2 by the distance of d/2, i.e., at a position which is equidistant from the principal surface 2*a* and the principal surface 2*b* when seen along a direction perpendicular to the principal surfaces 2*a*, 2*b*.

As described above, according to the optical microphone of the present embodiment, a light wave for detection of an acoustic wave is transmitted through the acousto-optic medium, section at a position which is equidistant from a pair of principal surfaces when seen along a direction perpendicular to the pair of principal surfaces. Therefore, the effect which is attributed to the flexure of the acousto-optic medium section 2 can be reduced, and a flat frequency characteristic can be realized.

3. Other Embodiments and Variations

The optical microphone of the present embodiment can have various variations. Hereinafter, embodiments other than that described above, or variations thereof, are described.

(1) Other Embodiments for Detecting the Optical Path Length Variation

In the above-described embodiments, for the purpose of detecting the optical path length variation of the acousto-optic medium section 2, the light emitting section 101 and the light receiving section 102 of the optical interferometer are provided such that the acousto-optic medium section 2 is interposed therebetween. Detection of the optical path length variation in the acousto-optic medium section 2 may be realized in different ways.

Figure 30A:
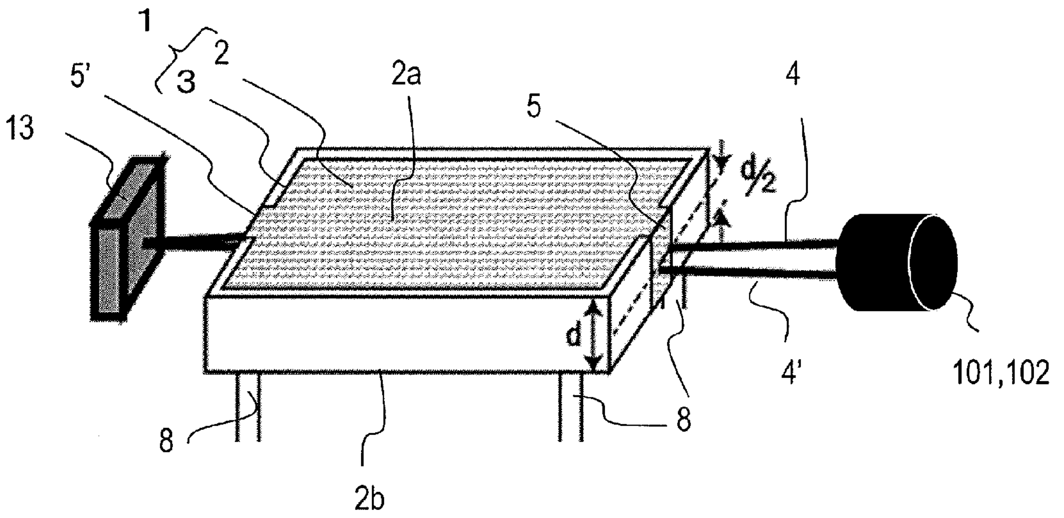
FIGS. 30A to 30C are diagrams showing other configurations of the optical microphone.

For example, in order to detect the optical path length variation of the acousto-optic medium section 2, the light wave 4 emitted from the light emitting section 101 may be allowed to go and return through the acousto-optic medium section 2. Specifically, as shown in FIG. 30A, a mirror 13 is provided in the vicinity of an opening 5' which is opposite to one opening 5 of the restraint section 3, and the light wave 4 is allowed to come into the acousto-optic medium section 2 from the opening 5. The light wave 4 transmitted through the acousto-optic medium section 2 goes out from the opening 5' and is then reflected by the mirror 13. The reflection from the mirror 13, which is a light wave 4', comes into the acousto-optic medium section 2 from the opening 5'. The light wave 4' is again transmitted through the acousto-optic medium section 2 and goes out from the opening 5. This light wave 4' is detected at the light receiving section 102.

Figure 30B:
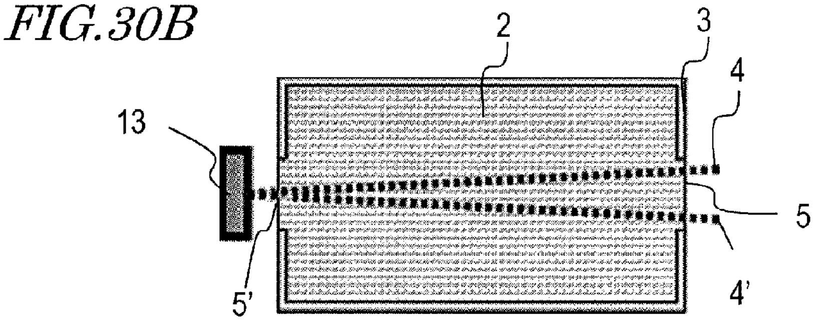
Figure 30C:
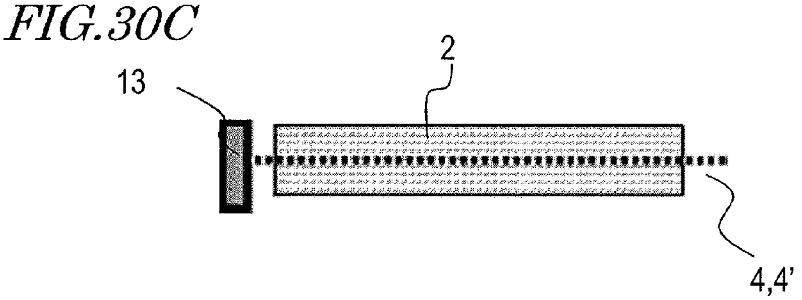

FIGS. 30B and 30C respectively show a cross section which is parallel to the principal surfaces 2*a*, 2*b* of the acousto-optic medium section 2 and a cross section which is perpendicular to the principal surfaces 2*a*, 2*b*. As shown in FIGS. 30B and 30C, each of the light waves 4, 4' is transmitted through the acousto-optic medium section at a height which is equidistant from the principal surfaces 2*a*, 2*b* when seen along a direction perpendicular to the principal surfaces 2*a*, 2*b*.

With the above configuration, the effect which is attributed to the flexure of the acousto-optic medium section 2 can be reduced, and a flat frequency characteristic can be realized. Further, the distance that the light waves 4, 4' propagate through the acousto-optic medium section 2, i.e., the optical path length, can be increased, and the optical path length variation also increases. Therefore, the sensitivity of the optical microphone can be improved.

(2) Variations of the Restraint Section 3

As previously described in the first embodiment, the restraint section 3 may have shapes and configurations shown in FIGS. 12, 13 and 14.

(3) Alternative Shapes of the Acousto-Optic Medium Section 2

As previously described in the first embodiment, the acousto-optic medium section 2 may have shapes and configurations shown in FIG. 16 to FIG. 21.

Other Embodiments

Figure 31:
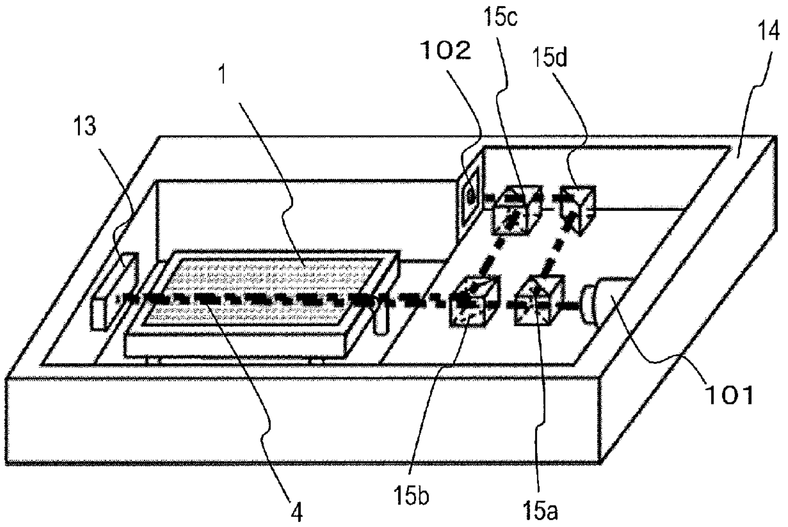
FIG. 31 is a diagram showing a specific configuration of the optical microphone.
Figure 32:
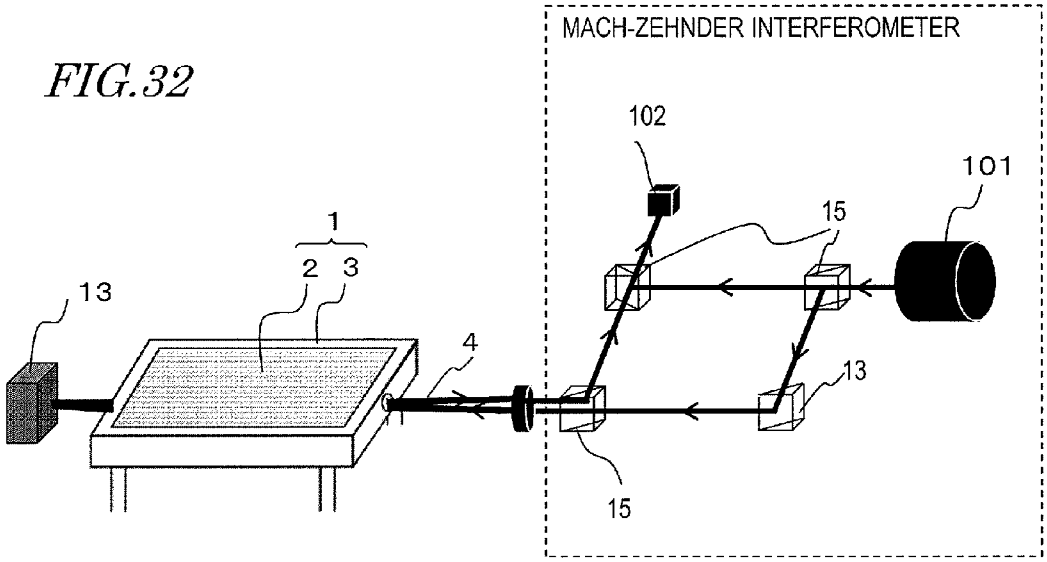
FIG. 32 is a diagram showing another configuration of the optical microphone.

The first embodiment and the second embodiment can be suitably combined together. The optical microphones of the first and second embodiments can be suitably combined with an optical interferometer. FIG. 31 shows an example of the configuration of an optical microphone that employs the optical microphone of the first or second embodiment which is configured such that the optical path of the light wave 4 is returned by a mirror 13, and a Mach-Zehnder interferometer, which is one of the homodyne interferometers, as the optical interferometer. As shown in FIG. 31, the acoustic wave receiving section 1, the light emitting section 101, and the mirror 13 are contained in a case 14 such that the acoustic wave receiving section 1 is interposed between the light emitting section 101 and the mirror 13. Further, half mirrors 15*a*, 15*b* are provided between the light emitting section 101 and the acoustic wave receiving section 1. A portion of the light wave 4 emitted from the light emitting section 101 is reflected by the half mirror 15*a*, and the direction of the light wave 4 is changed using a mirror 15*d* such that the light wave 4 propagates through a half mirror 15*c* and then impinges on the light receiving section 102 which is a photoelectric conversion element of the Mach-Zehnder interferometer. This light wave serves as the reference light wave. The light wave 4' which has transmitted through the acousto-optic medium section 2 of the acoustic wave receiving section 1 is reflected by half mirrors 15*b*, 15*c* so as to impinge on the light receiving section 102. With such a configuration, the acoustic wave receiving section 1 and the optical interferometer can be contained in the same case, and an optical microphone with excellent portability is realized. Note that, however, the acoustic wave receiving section 1 and the Mach-Zehnder interferometer may be independent of each other as shown in FIG. 32.

Figure 33:
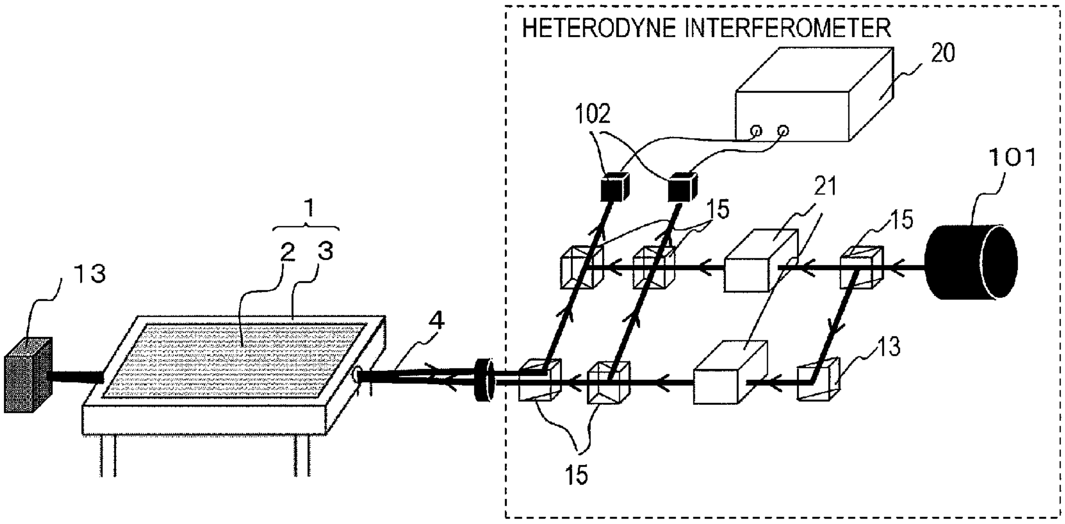
FIG. 33 is a diagram showing a configuration of the optical microphone which uses a heterodyne interferometer.
Figure 34:
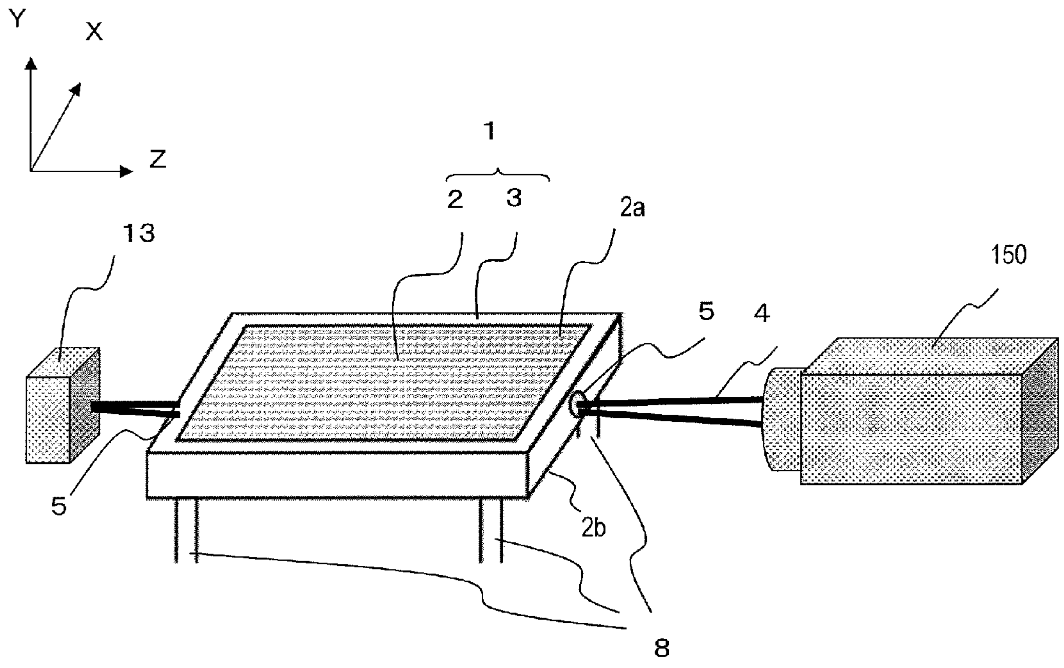
FIG. 34 is a diagram showing a configuration of the optical microphone which uses a laser Doppler vibrometer.
Figure 35:
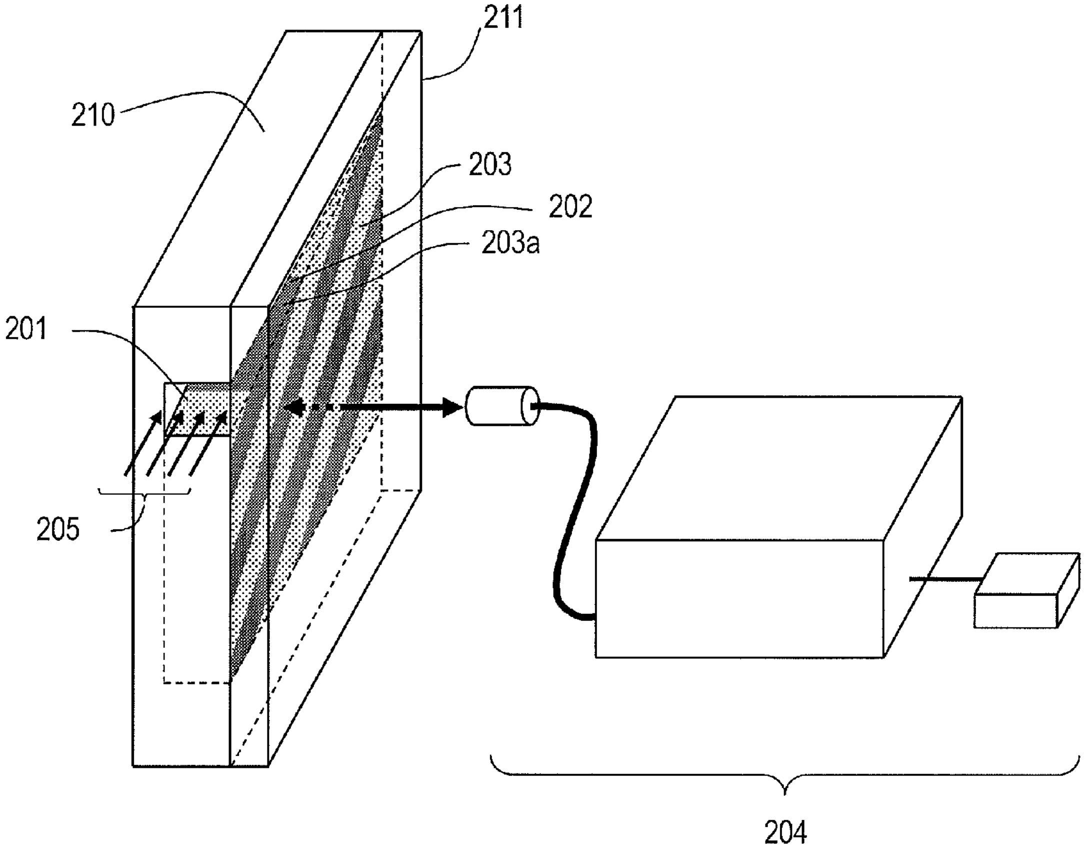
FIG. 35 is a diagram showing a configuration of a conventional optical microphone.

As the optical interferometer, an interferometer which is different from the Mach-Zehnder interferometer may be used. A heterodyne interferometer which includes a light emitting section 16, light receiving sections 102 that are photoelectric conversion elements, acoustic optical elements 21, half mirrors 15, a mirror 13, etc., as shown in FIG. 33, may be used as the optical microphone of the present embodiment. Alternatively, as shown in FIG. 34, a laser Doppler vibrometer 150 in which a light emitting section and a light receiving section are incorporated may be used.

An optical microphone which is disclosed in the present application is useful as a small-size ultrasonic sensor, an audible microphone, or the like.

While the present invention has been described with respect to embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical microphone, comprising:

an acousto-optic medium section having a pair of principal surfaces and at least one lateral surface provided between the pair of principal surfaces;

a restraint section which is in contact with the at least one lateral surface for preventing a shape change of the acousto-optic medium section; and a light emitting section for emitting a light wave so as to propagate through the acousto-optic medium section between the pair of principal surfaces, wherein the pair of principal surfaces are in contact with an environmental fluid through which an acoustic wave to be detected is propagating and are capable of freely vibrating, wherein the light wave comes into the acousto-optic medium section at a position which is equidistant from the pair of principal surfaces when seen along a direction perpendicular to the pair of principal surfaces and goes out from the acousto-optic medium section at a position which is equidistant from the pair of principal surfaces and an optical path length variation of a light wave propagating through the acousto-optic medium section, which is caused by the acoustic wave that comes into the acousto-optic medium section from at least one of the pair of principal surfaces and propagates through the acousto-optic medium section, is detected.

2. The optical microphone of claim 1, wherein the acousto-optic medium section is formed by a solid whose acoustic velocity is slower than that of air.

3. The optical microphone of claim 2, wherein the solid is a silica nanoporous element.

4. The optical microphone of claim 1, wherein the restraint section has at least one opening through which a light wave from the light emitting section comes in and/or goes out, and the restraint section is in contact with the at least one lateral surface of the acousto-optic medium section, exclusive of the at least one opening.

5. The optical microphone of claim 1, wherein each of the pair of principal surfaces has a rectangular shape.

6. The optical microphone of claim 1, wherein each of the pair of principal surfaces has an elliptical shape.

7. The optical microphone of claim 1, wherein each of the pair of principal surfaces has an octagonal shape obtained by truncating a rhombus at its two opposite ends.

8. The optical microphone of claim 1, wherein the acousto-optic medium section has a thickness varying along a direction parallel to the pair of principal surfaces in a cross section perpendicular to the pair of principal surfaces.

9. The optical microphone of claim 8, wherein the thickness is greater at opposite ends than at a center when seen along a direction parallel to the pair of principal surfaces.

10. The optical microphone of claim 8, wherein the thickness is smaller at opposite ends than at a center when seen along a direction parallel to the pair of principal surfaces.

11. The optical microphone of claim 4, further comprising a mirror provided at a position which is opposite to the at least one opening such that the acousto-optic medium section is interposed between the mirror and the at least one opening, wherein the light wave from the light emitting section comes into the acousto-optic medium section from the at least one opening and is reflected by the mirror, and thereafter, the light wave is again transmitted through the acousto-optic medium section and goes out from the at least one opening.

12. The optical microphone of claim 1, wherein the restraint section has a protruding portion extending in a direction not parallel to the at least one lateral surface, the protruding portion being inserted into the acousto-optic medium section.

13. The optical microphone of claim 1, wherein, in a cross section which is parallel to an extending direction of the protruding portion, a width of the protruding portion in a direction perpendicular to the extending direction is greater at a tip end of the protruding portion than at a base of the protruding portion.

14. The optical microphone of claim 13, wherein the protruding portion is parallel to the pair of principal surfaces and extends along the at least one lateral surface.

15. The optical microphone of claim 1 further comprising an optical interferometer which includes the light emitting section.

16. The optical microphone of claim 1 further comprising a laser Doppler vibrometer which includes the light emitting section.

17. The optical microphone of claim 1 further comprising a detection section for detecting the optical path length variation of the light wave propagating through the acousto-optic medium section, which is caused by the acoustic wave that comes into the acousto-optic medium section from at least one of the pair of principal surfaces and propagates through the acousto-optic medium section.

18. A method for detecting an optical path length variation in an optical microphone, the optical microphone including an acousto-optic medium section having a pair of principal surfaces and at least one lateral surface provided between the pair of principal surfaces;

a restraint section which is in contact with the at least one lateral surface for preventing a shape change of the acousto-optic medium section; and a light emitting section for emitting a light wave so as to be transmitted through the acousto-optic medium section between the pair of principal surfaces, wherein the pair of principal surfaces are in contact with an environmental fluid through which an acoustic wave to be detected is propagating and are capable of freely vibrating, and wherein the light wave comes into the acousto-optic medium section at a position which is equidistant from the pair of principal surfaces when seen along a direction perpendicular to the pair of principal surfaces and goes out from the acousto-optic medium section at a position which is equidistant from the pair of principal surfaces, the method comprising a step in which a detection section detects an optical path length variation of a light wave propagating through the acousto-optic medium section, which is caused by the acoustic wave that comes into the acousto-optic medium section from at least one of the pair of principal surfaces and propagates through the acousto-optic medium section.

* * * * *